United States Patent [19]
Billings

[11] Patent Number: 5,793,981
[45] Date of Patent: *Aug. 11, 1998

[54] SYSTEM FOR COMMUNICATING DATA IN A NETWORK USING BOTH A DAISY CHAIN LINK AND SEPARATE BROADCAST LINKS

[76] Inventor: Roger E. Billings, 26900 E. Pink Rd., Suite 1000, Independence, Mo. 64507-3284

[*] Notice: The term of this patent shall not extend beyond the expiration date of Pat. No. 5,761,433.

[21] Appl. No.: 690,676

[22] Filed: Jul. 31, 1996

Related U.S. Application Data

[63] Continuation-in-part of Ser. No. 556,518, Nov. 13, 1995, abandoned.

[51] Int. Cl.⁶ .................................................. G06F 13/40
[52] U.S. Cl. ............... 395/200.61; 395/311; 395/200.81; 370/365
[58] Field of Search ............... 370/364, 365; 395/200.81, 200.6, 200.61, 182.04, 311

[56] References Cited

U.S. PATENT DOCUMENTS

| | | | |
|---|---|---|---|
| 3,970,994 | 7/1976 | Jenny | 395/311 |
| 4,417,334 | 11/1983 | Gunderson et al. | |
| 4,514,843 | 4/1985 | Albanese | |
| 4,627,050 | 12/1986 | Johnson et al. | 370/363 |
| 4,692,919 | 9/1987 | West, Jr. | |
| 4,696,001 | 9/1987 | Gagliardi et al. | |
| 4,701,756 | 10/1987 | Burr | |
| 4,701,910 | 10/1987 | Ulug | |
| 4,805,169 | 2/1989 | Van Asselt | |
| 4,901,312 | 2/1990 | Hui et al. | |
| 4,959,829 | 9/1990 | Griesing | |
| 5,001,707 | 3/1991 | Kositpaiboon et al. | |
| 5,012,467 | 4/1991 | Crane | |
| 5,027,342 | 6/1991 | Boulton et al. | |
| 5,157,657 | 10/1992 | Potter et al. | |
| 5,179,555 | 1/1993 | Videlock et al. | |
| 5,218,604 | 6/1993 | Sosnosky | |
| 5,251,213 | 10/1993 | Videlock et al. | |
| 5,296,936 | 3/1994 | Pittas et al. | 358/407 |
| 5,311,114 | 5/1994 | Sambamurthy et al. | |
| 5,351,241 | 9/1994 | Yehonatan | |
| 5,365,523 | 11/1994 | Derby et al. | |
| 5,422,880 | 6/1995 | Heitkamp et al. | |
| 5,442,631 | 8/1995 | Tanaka et al. | |
| 5,477,530 | 12/1995 | Ahmadi et al. | |

FOREIGN PATENT DOCUMENTS 8702281  4/1988  WIPO.

*Primary Examiner*—Richard L. Ellis
*Attorney, Agent, or Firm*—Oppenheimer Wolff & Donnelly LLP

[57] ABSTRACT

The wide area network includes a plurality of local area networks (LANs) in communication with a remote source. Each of the LANs includes a plurality of workstations. The workstations generate data packets for delivery to other workstations in the LAN. A packet assembly channel receives data packets from the workstations and routes the received data packets through the workstations to a LAN broadcast unit. The LAN broadcast unit broadcasts data packets generated by the workstations to each of the workstations via a LAN broadcast channel. The remote source generates data packets for delivery to the workstations in each of the LANs. Each LAN has a remote broadcast unit in communication with the remote source for broadcasting data packets from the remote source to the workstations in that LAN on a remote broadcast channel.

4 Claims, 15 Drawing Sheets

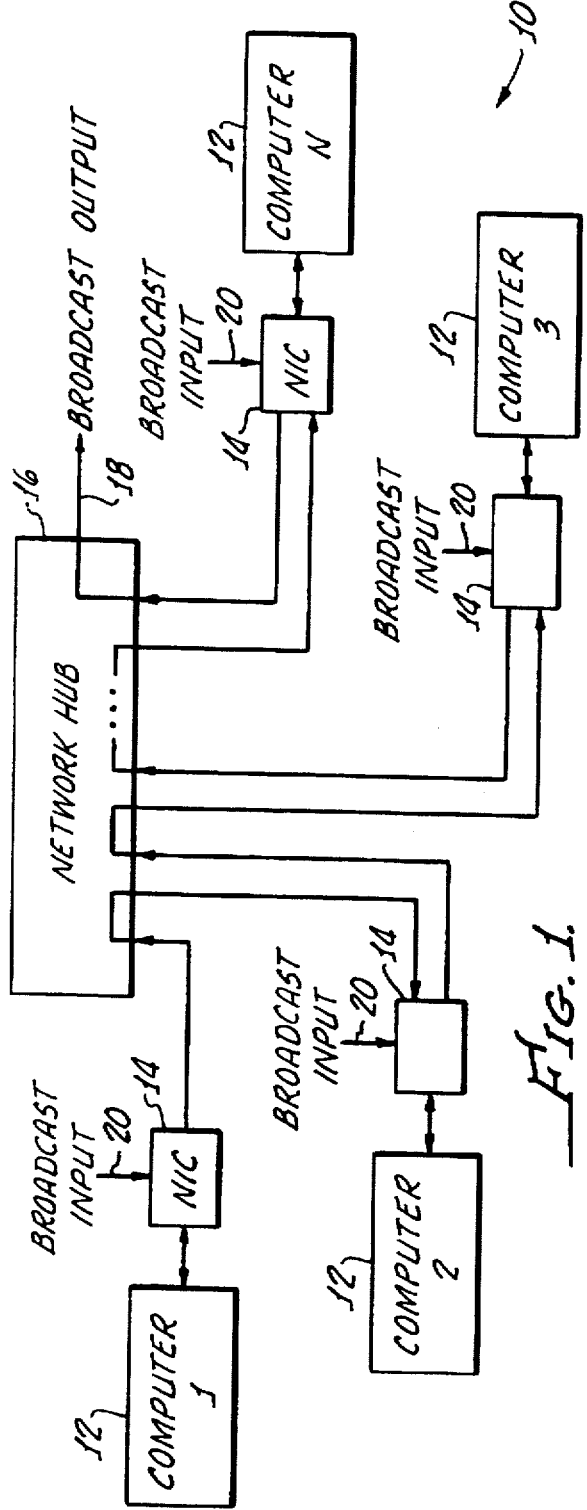
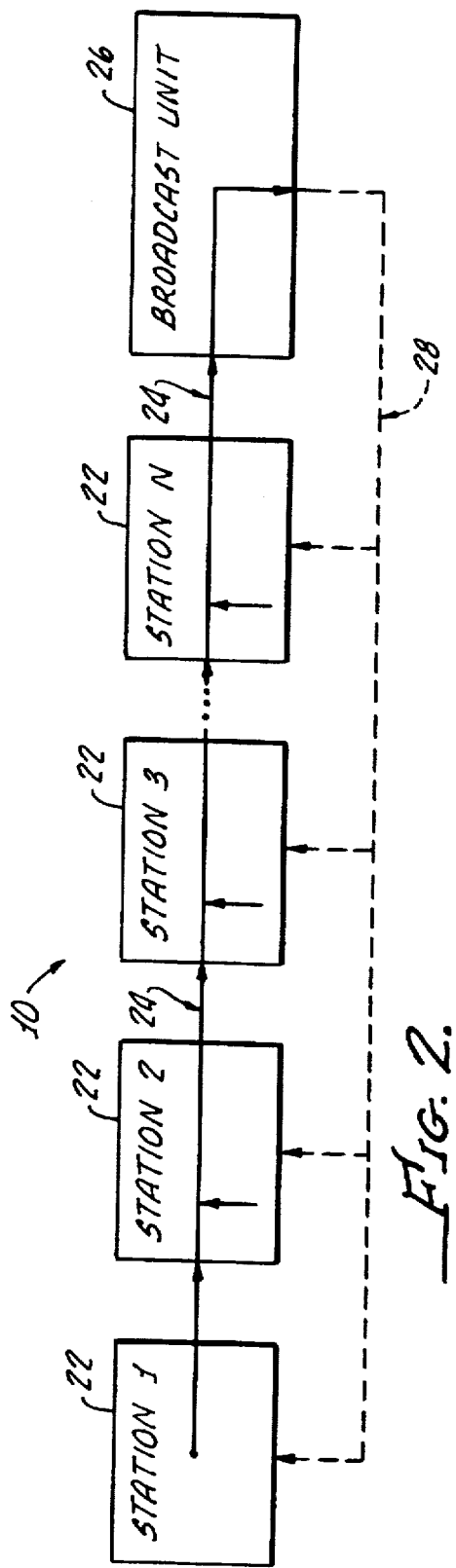

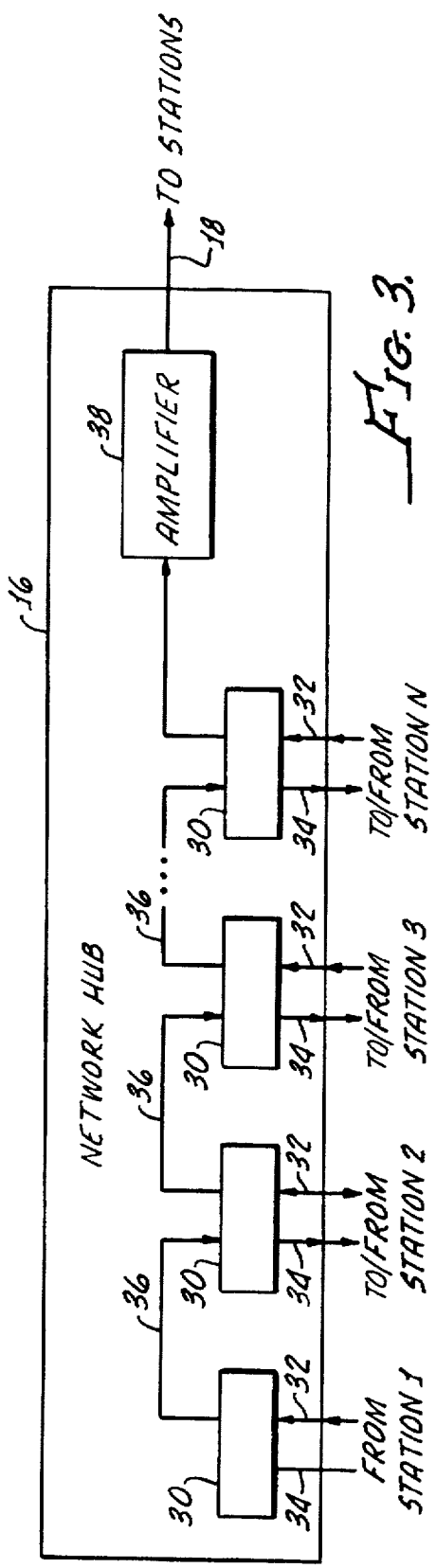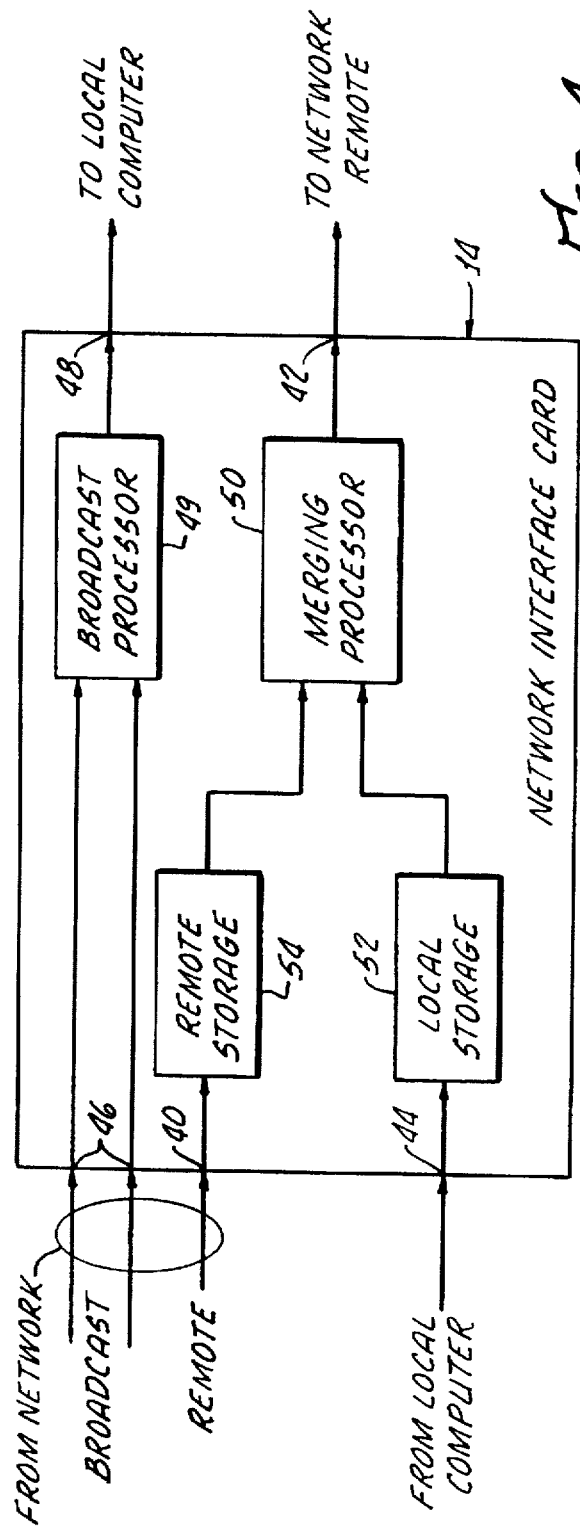

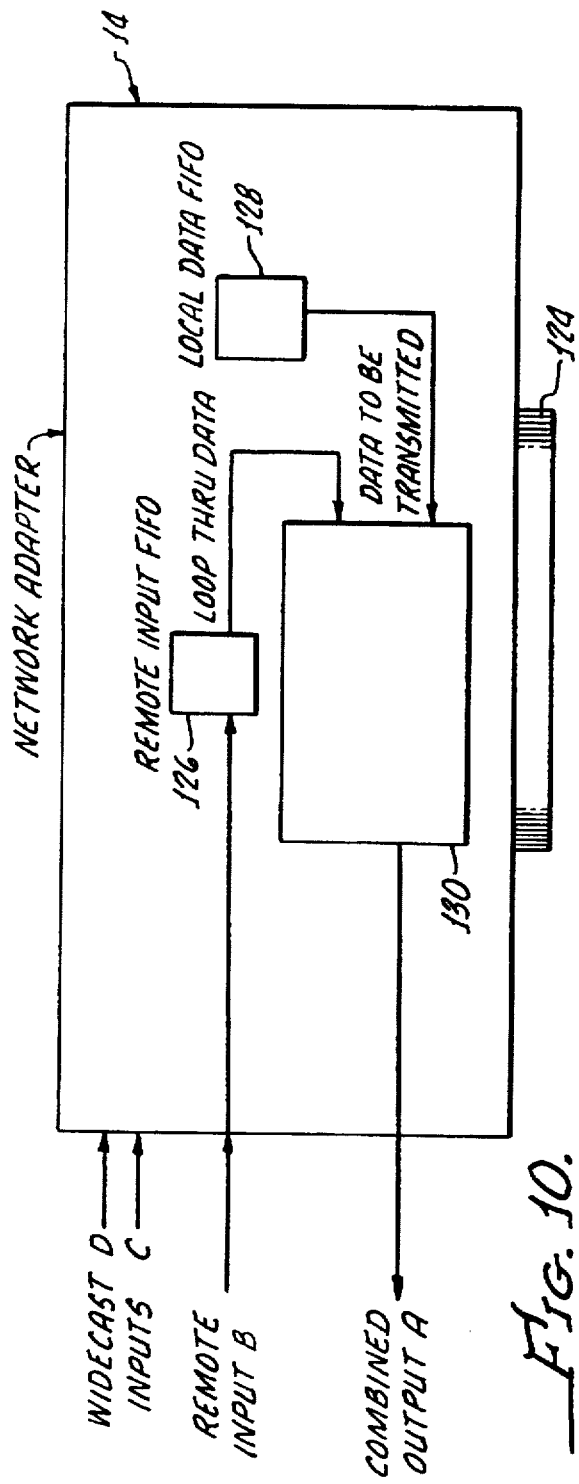
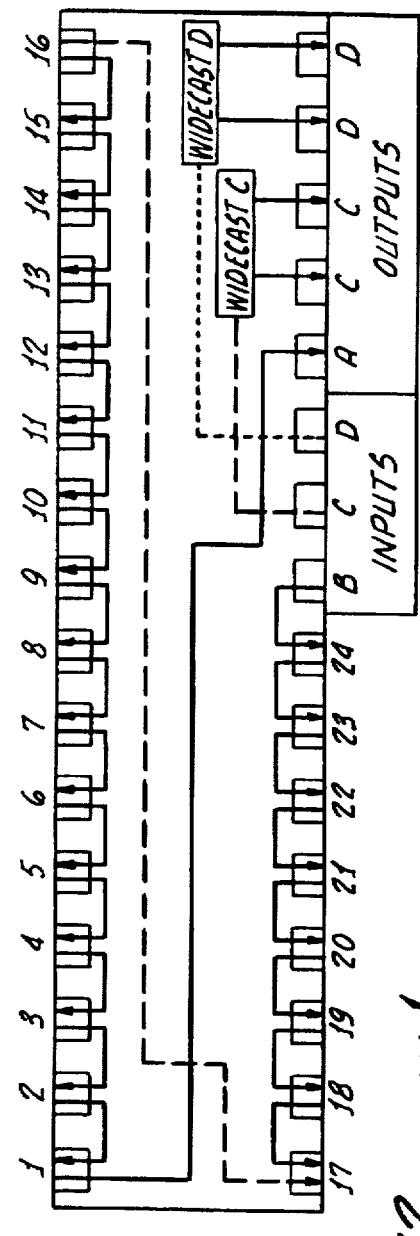
Fig. 10.
Fig. 12.

SYSTEM FOR COMMUNICATING DATA IN A NETWORK USING BOTH A DAISY CHAIN LINK AND SEPARATE BROADCAST LINKS

CROSS-REFERENCE TO PRIOR APPLICATION

The present invention is a continuation-in-part application of U.S. patent application Ser. No. 08/556,518 filed on Nov. 13, 1995 now abandoned.

BACKGROUND OF THE INVENTION

1. Field of the Invention

The present invention relates to computer networks and, more particularly, to wide area and local area computer networks in which data is communicated among a plurality of computers.

2. Description of Related Art

Computer networking involves moving data from one point to another. Computer networking or "interoperation" usually begins with computers in the same office or the same building connected in a local network. The term "local area network" or LAN describes a group of computers typically connected by no more than 1,000 feet of cable which interoperate and allow people to share resources.

In the late 1970s and early 1980s, important work was done on LANs for a large number of computers. An important set of standards and protocols called "Ethernet" was conceived and developed to the point of becoming a commercial product. At about the same time, another set of standards and protocols known as "ARCNET" was developed. Soon thereafter, a third major networking technology known as "Token Ring" was developed.

With the rapid increase of interest in networks, particularly local area networks, client/server computing is quickly becoming the backbone of data processing systems. As local area networks expand and as data processing tasks become more complex, networks become more congested, resulting in poor performance and requiring more complicated customer installations.

Many of today's applications require networks with high bandwidth capabilities. Databases are becoming larger and more sophisticated and are being accessed by greater numbers of users. Further, many industries have been migrating toward applications involving high-resolution color graphics, which applications require high bandwidth to handle the large amount of data involved with this type of graphics.

In many application environments, it is often desirable to store executable files in central data servers or file servers, to which computer workstations in the network are connected, rather than on the local disk drives of workstations. This is because the application programs must be constantly maintained and updated to ensure compatibility with new peripherals and to take advantage of the latest revisions. This approach is especially advantageous in large organizations where the technical labor requirement for updating application programs at every workstation is impractical.

However, when a substantial number of users (i.e., computers) simultaneously load program files over the network, bandwidth quickly becomes a serious problem. Even networks with fewer than 100 workstations can become unusably sluggish in performance when the users are actively loading and executing programs from, for example, the Windows™ environment, over the network.

To alleviate these problems, the common wisdom has been to install more file servers and to divide the network into smaller local area networks connected together by routers or bridges. While this approach has greatly improved performance for many organizations, it is costly and creates delays and complications when it is necessary for users to share information over a wide area of the network.

The computer industry is responding to these problems with a diversity of new and innovative products. Ethernet adapters with data rates of up to 100 megabits per second (Mbps) are now commercially available and are quickly becoming affordable. Another approach, known as "switching hub technology," dedicates a portion of the LAN to a single or small group of users. Many Token Ring LANs have also risen to the challenge to find ways to increase their performance and are operating at 16 Mbps.

Most networking managers are looking forward to the introduction of Asynchronous Transfer Mode (ATM) protocol as the solution to their networking bandwidth problems. Although most analysts see ATM as the wave of the future, its emergence has been slower than predicted, because ATM doesn't neatly fit the layered models common to existing networks and the ATM specification itself does not encompass such things as speed and protocols. ATM is a sophisticated switch networking system that hosts an active application at each end. Although it breaks data into 53-Byte "Cells," ATM is not a packet switched or router network architecture. In fact, for every stream of data sent, ATM creates a virtual circuit among two or more points. Many on-line services, newspapers, and cable television providers believe ATM, with its roots in a telecommunications effort to unify voice and data transmissions, is the pipe they need to deliver large amounts of information to a desktop or set top box. But for that to happen, users will need faster PCs, ATM aware applications, and lower prices.

Existing networks have achieved a degree of interoperability through a foundation in the seven-layer Open Systems Interconnection (OSI) model. ATM, on the other hand, with its dedicated point-to-point connections, is a clear deviation from current technologies. To implement the ATM approach, application software needs to be modified to become ATM aware. This is necessary since the topology differences between ATM and today's networking schemes will require logical decisions which, in some cases, cannot be adequately provided through customized physical layer interfaces and drivers.

Network Interface Cards

Network interface cards, sometimes called LAN adapters, function as an interface between the computer and the network cabling, linking the computer to the network cable system. The card controls the flow of data between the computer's internal data bus and the serial stream of data on the network cable. Some computers are provided with a network interface card on the motherboard of the computer, but the cards are usually added to the computer's expansion bus. Network interface cards also change the form of the computer generated data from a wide parallel stream, e.g., 8 bits at a time, to a narrow stream moving 1 bit at a time in and out of the network port. Conventional network interface cards buffer data because the computer is typically much faster than the network.

Many network interface cards have a processor specially designed for onboard processing power. These processors are augmented by 8K to 64K of RAM and by specialized transceivers that handle the electrical interface with the cable.

Network interface cards generate the electrical signals that travel over the network cable. Each network interface card follows specific rules controlling access to the cable. Network interface cards for Ethernet and Token Ring both use the same basic system of electrical signaling of the cable. A technique called Manchester encoding provides a way to transmit 0s and 1s using direct current voltage pulses that range from −15 to +15 volts. The network interface cards translate each eight changes in the voltage level as a character in the ASCII data alphabet.

The Ethernet Protocol

In the Ethernet approach to networking, each data packet issued by each computer in the network is received by all the other computers in the network. A computer monitors the network to determine when the network is idle, at which time the computer may issue a packet. If the network is busy, the computer must wait. If two or more computers determine that the network is idle and respectively issue packets at the same time, a collision occurs. In busy Ethernet networks, collisions occur frequently.

In an Ethernet network, the interface cards share the common cable by listening before they transmit and transmitting only during a break in the traffic when the channel is quiet. This technique is called carrier-sense multiple access with collision detection (CSMA/CD). With collision detection, if two stations begin to transmit at the same time, they detect the collision, stop, and retry after a sufficient time interval.

The Token Ring Protocol

Collisions are eliminated by the Token Ring approach. In a Token Ring network, packets travel from computer to computer in a closed-loop ring. A packet will travel in this manner until the packet reaches its address, at which time it is read and removed from the ring by the computer at that address.

Network interface cards for Token Rings use a complex media-access control scheme called "token passing." Whereas Ethernet cards contend for access to the cable, Token Ring cards must have permission to transmit into a cable system that forms a complete electrical loop or ring. Under this technique, the active cards negotiate, using their built-in serial number, to determine a master interface card. The master initiates a special message called a free token. When an interface card with data to send receives a free token, it changes the free token into a message and sends it to the next station up the ring for relay. After the addressed interface card receives the message and the message returns to the originating interface card, that card initiates a new free token and the process begins again. As a drawback, a computer must wait for the marker before issuing a packet. Further, if a packet is addressed incorrectly or is otherwise undeliverable, the packet will endlessly circulate in the token ring. Therefore, special means must be provided to keep the ring clear.

The ARCNET Protocol

ARCNET network interface cards use a media-access control scheme. A designated "master card" maintains a table of all active network interface cards and polls each network interface card in turn, giving permission to transmit.

More specifically, ARCNET uses a star cabling pattern with passive and active hubs that can extend the cabling farther than Ethernet or Token Ring configurations. Networked devices share the cabling using an orderly polling scheme. The installer sets switches on each network interface card, which gives the card a specific number. The lowest numbered active card becomes a master controller. It sends a message to each adapter in sequence, giving it permission to transmit any data it holds. The standard ARCNET signaling speed of 2.5 Mbps limits the maximum throughput, although faster speeds have been recently developed.

The Asynchronous Transfer Mode Protocol

An ATM network is configured much like a telephone network. An issued packet travels from the issuing computer to the receiving computer on a communication line that other computers in the network are not currently sharing. Application software often needs to be modified to be compatible with an ATM network.

SUMMARY OF THE INVENTION

It is an object of the present invention to provide a wide area network (WAN) which mitigates and/or obviates the aforementioned drawbacks of conventional networking protocols.

It is another object of the invention to provide a wide area network in which data is communicated in a highly efficient manner.

It is a further object of the invention to provide a wide area network which operates much faster than existing wide area networks.

It is still another object of the present invention to provide a wide area network which has a large bandwidth.

These objects as well as other objects, features, and benefits of the present invention are achieved by providing a wide area network in which separate data transmission channels are utilized to communicate data packets within the network. The wide area network includes a plurality of local area networks (LANs) in communication with a remote source. Each of the LANs includes a plurality of workstations. The workstations generate data packets for delivery to other workstations in the LAN. A packet assembly channel receives data packets from the workstations and routes the received data packets through the workstations to a LAN broadcast unit. The LAN broadcast unit broadcasts data packets generated by the workstations to each of the workstations via a LAN broadcast channel.

The remote source generates data packets for delivery to the workstations in each of the LANs. Each LAN has a remote broadcast unit in communication with the remote source for broadcasting data packets from the remote source to the workstations in that LAN on a remote broadcast channel. A wide area network configured according to the principles of the present invention operates faster and more efficiently than conventional wide area networks.

According to one aspect of the present invention, a wide area network includes a remote source, capable of generating addressed data packets and broadcasting addressed data packets from a remote broadcast output, and a plurality of local area networks (LANs) in communication with the remote source. Each of the LANs includes a plurality of workstations each having a unique address and being capable of generating addressed data packets. Each of the workstations includes a packet assembly input for receiving addressed data packets from another workstation, and a packet assembly output for delivering addressed data packets to another workstation. A LAN broadcast input receives addressed data packets from the workstations in the LAN via a LAN broadcast channel connected between the packet assembly output of the last workstation and the LAN broadcast input of each of the workstations. A remote broadcast input receives addressed data packets from the remote source via a remote broadcast channel connected between the remote broadcast output of the remote source and the remote broadcast input of each of the workstations.

Each workstation further includes an interface connected to the packet assembly input, the packet assembly output, the LAN broadcast input, and the remote broadcast input. The interface merges addressed data packets received at the packet assembly input with addressed data packets generated by the workstation into a stream of workstation-addressed data packets. The interface then delivers the stream of workstation-addressed data packets to the packet assembly output. The interface also detects addressed data packets from the LAN broadcast input and the remote broadcast input which bear the unique address of the workstation, and delivers the detected packets to the workstation for further processing.

One feature of the present invention is that the data packets generated by the workstations and the remote source are broadcast to the workstations on separate broadcast channels. This is advantageous in that the workstations in each LAN in the wide area network may continue operating normally while receiving data packets received from the remote source, such as a mail server. The separate broadcast channels include the LAN broadcast channel and the remote broadcast channel.

Another feature of the present invention is the sequential assembly of data packets generated by all the workstations, which takes place on a packet assembly channel. The packet assembly channel connects each of the workstations together in a sequential chain beginning with a first of the workstations and ending with a last of the workstations. The chain is formed by connecting the packet assembly output of each of the workstations, except the last workstation, to the packet assembly input of the next workstation in sequence through a packet communication connection.

Other aspects, features, and advantages of the present invention will become apparent to those skilled in the art from a reading of the following detailed description with reference to the accompanying drawings.

BRIEF DESCRIPTION OF THE DRAWINGS

FIG. 1 is a block diagram of an exemplary embodiment of a computer network implemented according to networking principles of the present invention;

FIG. 2 is a block diagram of a computer network illustrating networking principles of the present invention, particularly illustrating a chain of stations connected by a sequential reception channel and a separate delivery channel;

FIG. 3 is a block diagram of an exemplary embodiment of a network hub configured in accordance with networking principles of the present invention;

FIG. 4 is a block diagram of an exemplary embodiment of a network interface card configured in accordance with networking principles of the present invention;

FIG. 10 is a schematic view of an exemplary embodiment of a network interface card implemented in accordance with the invention;

FIG. 12 is a schematic view of an exemplary embodiment of a network hub implemented in accordance with the present invention;

DETAILED DESCRIPTION OF THE PREFERRED EMBODIMENTS

Figure 5A:
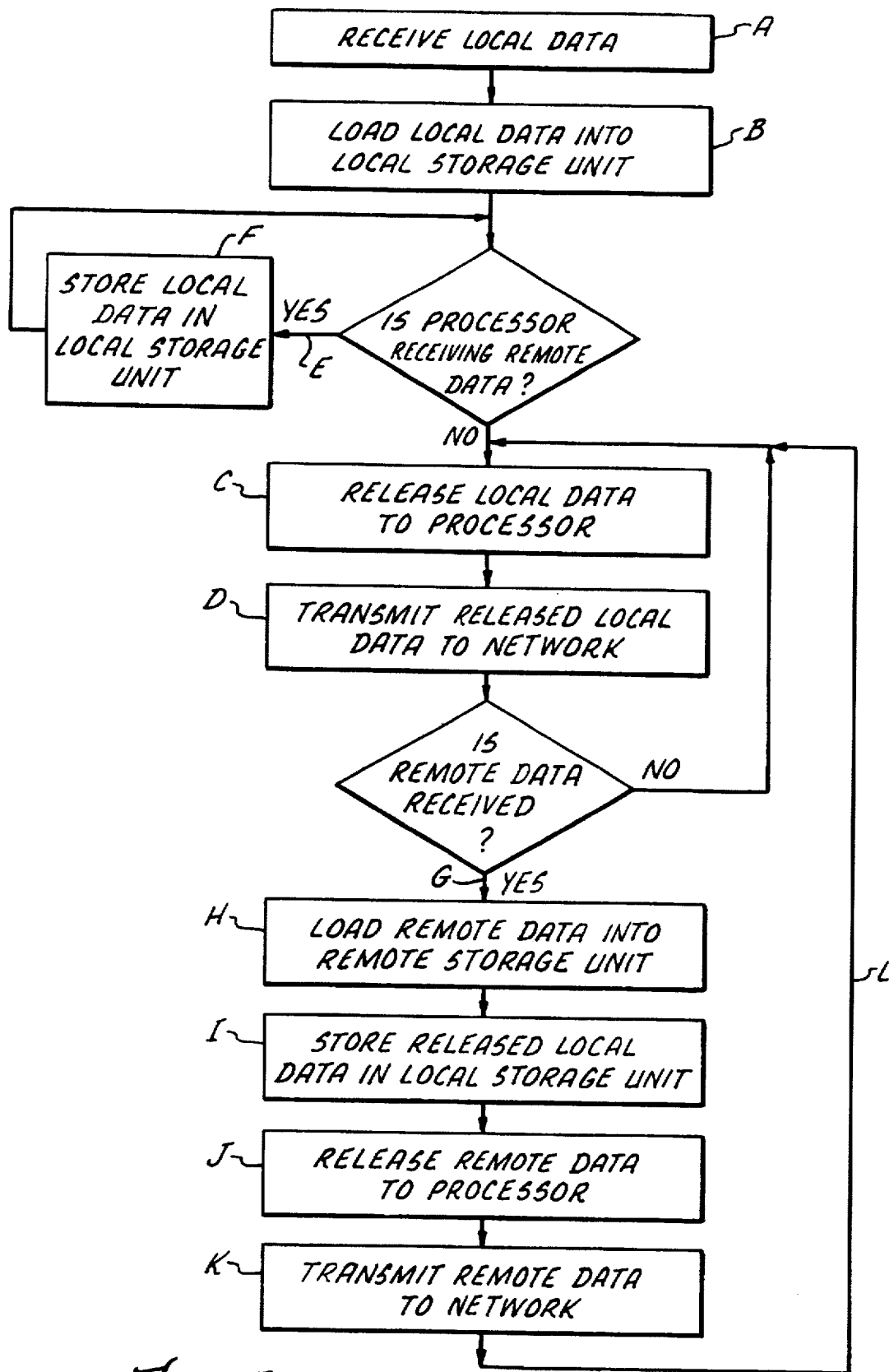
FIG. 5A is a block diagram of an exemplary method of merging data packets implemented in accordance with the networking principles of the invention.

Networking principles of the present invention are exemplified by the embodiments illustrated in the drawings. These principles focus on a two-channel approach to communicating data within a network environment. Exemplary embodiments of these networking principles may take different forms, many of which are illustrated in the drawings. However, the disclosure herein will detail specific preferred embodiments of this novel approach to networking and will not provide an exhaustive description of all embodiments within the scope of the networking principles set forth herein and in the appended claims.

The Network

Referring to the drawings, particularly to FIG. 1, a network 10 implemented according to the principles of the present invention is shown. The network 10 utilizes two separate transmission channels to communicate data within the network 10. One of the transmission channels sequentially routes data issued from computers in the network 10 through the computers in the network. The other transmission channel broadcasts this routed data to all the computers in the network 10. As known in computer networking, data generated by computers is typically in the form of data packets. Each data packet includes not only the data generated by the computer but may also include addressing information, error detection information, and so on, so that each packet may be an addressed data packet.

More specifically, the network includes a plurality of computers 12, preferably being capable of generating data, in communication with each other via communication media. Each of the computers 12 is provided with a network interface card (NIC) 14. A network hub 16 interconnects the plurality of network interface cards 14, thereby interconnecting the computers 12 of the network 10. The network hub 16 also communicates via a broadcast output 18 thereof with a broadcast input 20 of each of the network interface cards 14.

The interface between the computer 12 and the network interface card 14 allows the computer 12 to generate data packets and to provide these generated data packets (i.e., local data packets) to the network interface card 14 for transmission to the network 10. The interface also allows the network interface card 14 to provide the computer 12 data packets received from the network or from a remote source (i.e., remote data packets).

As illustrated in FIG. 1, the computers 12 are connected in the form of a chain of computers beginning with a first computer (i.e., Computer 1) and ending with a last computer (i.e., Computer N) in the chain. In linking the computers 12 in this manner, data generated by Computer 1 is sent to the network hub 16 which in turn sends this Computer 1 data to Computer 2. In addition to sending the Computer 1 data back to the network hub 16, Computer 2 may also generate and send its own local data to the network hub 16. The network hub 16 then sends the Computer 1 and Computer 2 data to Computer 3. This sequential linking of the computers 12 continues through to the last computer in the chain, i.e., Computer N. The last computer, however, is not linked back to the first computer.

Computer N receives remote data packets from the network hub 16, which remote data packets are data packets generated by any one of or all of the computers preceding Computer N in the network (i.e., Computer 1 through Computer N-1). Computer N sends these remote data packets back to the hub 16, and may add local Computer N data packets to the chain of data packets. Therefore, data packets received by the network hub 16 from the last computer in the chain of computers, i.e., Computer N, are the data packets generated by any and all the computers 12 in the network 10, which may be called "network data packets." The network hub 16 then broadcasts these network data packets to all the network interface cards 14 in the network 10. Each of the network interface cards 14 then in turn provides these network data packets to the computer 12 connected thereto. Accordingly, all the computers 12 in the network 10 receive any data packet generated by any of the computers 12 in the network 10.

In view of the foregoing description, the networking principles of the present invention may be described as a network in which (1) data packets are sequentially gathered from the computers in the network on a reception or packet assembly medium and (2) the sequentially gathered data packets are delivered to all the computers in the network at the same time on a delivery or packet broadcast medium.

A block diagram illustrating this novel networking principle is shown in FIG. 2. The network 10 includes a plurality of nodes or stations 22 (each station 22 preferably including a computer and a network interface card) through which data packets issued by the stations 22 are sequentially chained and routed on a reception medium 24. The last station 22, i.e., Station N, provides the sequentially chained and routed data packets to a broadcast unit 26 which broadcasts these data packets from the last station to all the stations 22 on a delivery medium 28, shown in dashed line.

In order to describe the present invention as clearly as possible, generic terms for many of the devices and ideas common to networking technology are used. For example, in addition to the term "data" mentioned above, the term "computer" is used to described any electronic device capable of being connected within a network, including computer workstations, file servers, computer peripherals (which may not be capable of generating data to send over the network), and so on. The term "station" is used to describe a computer coupled with a network interface card. The term "communication media" encompasses all media forms used to communicate data, including, for example, coaxial cable, twisted-pair cable, fiber optical systems, infrared systems.

The Network Hub

A network hub implemented according to the principles of the present invention is shown in FIG. 3. The network hub 16 may function as a media access unit by configuring the communication media of the network 10 into a reception or packet assembly channel for sequentially routing data packets through the last computer in the network and a delivery or packet broadcast channel for broadcasting data packets routed through the last computer in the network to all the computers in the network.

In order to do this, the network hub 16 includes a plurality of input-and-output pairs 30. Each input-and-output pair 30 has an input 32 and an output 34 paired together. Each input-and-output pair 30 communicates with the network interface card of a station or computer of the network 10 via the delivery channel 24 as described above. The input 32 of each input-and-output pair 30 is connected to the output 34 of another input-and-output pair 30, shown by connection 36. Accordingly, data packets issued by a first station are received by the input 32 of a first input-and-output pair 30 and are then provided to the output 34 of a second input-and-output pair 30, which data packets are then sent to a second station. The input-and-output pair 30 communicating with the last station in the network, i.e., Station N, provides data packets received by the input 32 thereof to a broadcast amplifier 38. The broadcast amplifier 38 then provides these data packets to the broadcast output 18 to be broadcast to all the stations via the delivery channel 28.

The Network Interface Card

A network interface card implemented according to the principles of the present invention is shown in FIG. 4. The network interface card 14 includes a remote input 40 and a remote output 42, each of which is connectable to the reception medium 24. The remote input 40 receives data packets from one of the input-and-output pairs 30 of the network hub 16 and provides these data packets to the remote output 42. The remote output 42 in turn provides the data packets to the next input-and-output pair 30 sequentially in the hub 16.

The network interface card 14 further includes a local input 44 which is connectable to the computer 12. The local input 44 is in communication with the remote output 42. The local input 44 receives data packets from the computer to which it is connected and provides these data packets to the remote output 42 for transmission to the network hub 16 on the reception medium 24. The remote input and output 40 and 42 and the local input 44 are concerned with the gathering, merging, and routing of data packets in the network on the first transmission medium 24.

Regarding the handling of data packets on the delivery medium 28 of the network 10, the network interface card 14 further includes at least one but preferably two broadcast inputs 46 and a local output 48 in communication with the inputs 46.

The first broadcast input 46 is connectable to the delivery medium 28 of the network, receives the broadcast network data packets from the broadcast output 18 of the network hub 16, and provides the broadcast data packets to the local output 48. The local output 48 then provides the network data packets to the computer to which it is connected. Either the network interface card 14 or the computer to which it is coupled may determine which of the data packets of the broadcast data packets are addressed to the computer.

According to the exemplary embodiment shown, the network interface card 14 may include a broadcast processor 49 connected between the broadcast inputs 46 and the local output 48. The broadcast processor 49 receives data packets from the broadcast inputs 46 and determines which of the data packets are addressed to the local computer. The broadcast processor 49 then transmits the data packets addressed to the local computer to the local output 48. In other words, the broadcast processor 49 monitors data packet traffic and captures only those data packets fulfilling the address requirement programmed by the local computer. The network interface card 14 may additionally include a memory device for storing address, as well as other, information.

If both broadcast inputs 46 are receiving data simultaneously, the broadcast processor 49 may toggle the connection between the broadcast inputs 46 and the local output 48. This may take place under software control from the local computer. Further, the computer may decide which of the broadcast inputs 46 to monitor and receive data from under different circumstances.

The Packet-Merging System

In order to efficiently route data packets sequentially through the chain of network interface cards 14, each of the network interface cards 14 merges local data generated by the computer 12 with any remote data being received at the remote input 40. With continued reference to FIG. 4, the network interface card 14 in accordance with the present invention may also include a merging processor 50. The merging processor 50 is in communication with the local input 44, the remote input 40, and the remote output 42. The merging processor 50 alternatingly transmits to the remote output 42 local data packets received at the local input 44 and remote data packets received at the remote input 40. The merging processor 50, upon receiving local data from the local input 44, creates the local data packet to be sent out to the network via the reception medium 24.

The preferred embodiment of the network interface card 14 also includes a local storage device 52 and a remote storage device 54. The local storage device 52 is connected between the local input 44 and the merging processor 50. The local storage device 52 receives data packets received at the local input 44 from the computer and provides these data packets to the merging processor 50. The remote storage device 54 is connected between the remote input 40 and the merging processor 50. The remote storage device 54 receives data packets received at the remote input 40 and provides these data packets to the merging processor 50.

With additional reference to FIG. 5A, when local data packets are received at the local input 44 (block A) and loaded into the local storage device 52 (block B), the merging processor 50 detects the change in status of an "empty" flag in the local storage device 52. The local data packets are then immediately released to the merging processor 50 (block C) and transmitted to the network (block D) via the remote output 42. However, if the merging processor 50 is currently busy transmitting remote data packets (path E), the local data packets are then stored in the local storage device 52 (block F) until the merging processor 50 has transmitted the remote data packets to the network and is no longer "busy," at which time the local data packets are release by the local storage device 52 (block C) and transmitted to the network (block D).

If remote data packets are received at the remote input 40 (path G) while local packets are being released and transmitted to the network, then the release and transmission of local data packets is preferably temporarily suspended in order to transmit the remote packets through the network interface card 14 first, with any remaining local data packets transmitted thereafter. In other words, the transmission of remote data has priority over the transmission of local data. Upon receiving remote data packets, the remote packets are loaded into the remote storage device 54 (block H) and any yet unreleased (and untransmitted) local data packets are stored in the local storage device 52 (block I) so that the remote packets may be released to the processor (block J) and transmitted to the network (block K). When the received remote data packets have been transmitted, any remaining unreleased local packets may then be released and transmitted (path L and blocks C and D).

Figure 5B:
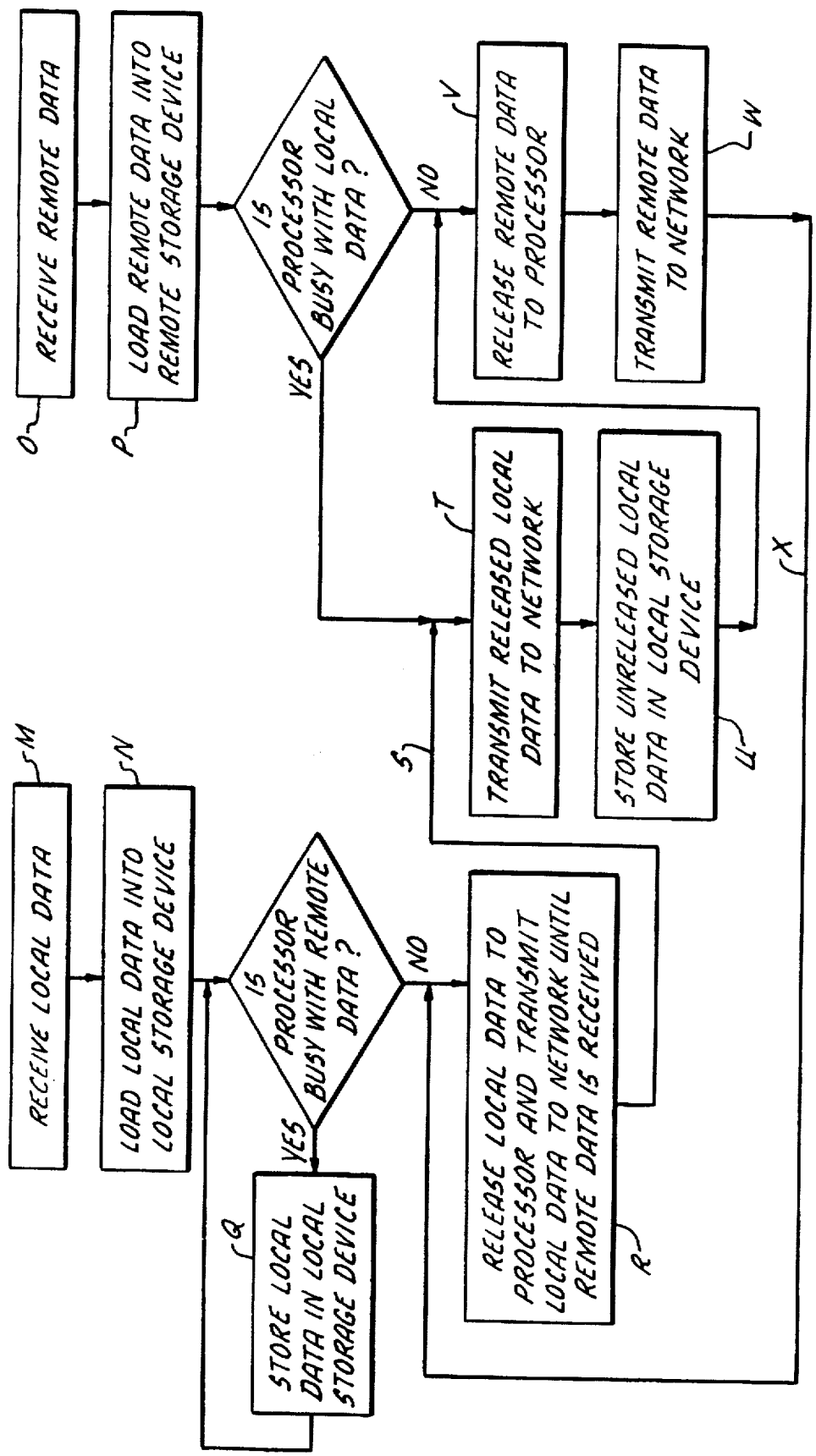
FIG. 5B is a block diagram of another exemplary method of merging data packets implemented in accordance with the networking principles of the invention.

This priority principle is alternatively illustrated in FIG. 5B. As mentioned above, local data packets are received at the local input 44 (block M) and loaded into the local storage device 52 (block N). Similarly, remote data packets are received at the remote input 40 (block O) and loaded into the remote storage device 54 (block P). If local data packets are received and the merging processor 50 is busy with remote data packets, the local packets are then stored in the local storage device 52 (block Q). If the processor 50 is not busy with remote packets, then the local packets are released to the processor 50 and transmitted to the network until remote data packets are received (path S). When remote packets are received (block O), the processor 50 will transmit any released local packets to the network (block T), and any unreleased local packets are stored in the local storage device 52 (block U). Thereafter, the received remote data packets are released to the merging processor 50 and transmitted to the network (block W). After all the remote packets have been transmitted (path X), the release and transmittal of the local data packets may continue (block R). This entire process takes place at high speeds.

If no local packets are being released and transmitted to the network and remote data packets are received at the remote input 40 (block O) and loaded into the remote storage device 54 (block P), then the merging processor 50 detects the change in status of an "empty" flag in the remote storage device 54. The remote data packets are then immediately released to the processor 50 (block V) and transmitted to the network (block W) via the remote output 42.

The Mirrored-Server Topology

The networking principles of the present invention may be implemented in many various network topologies. One such topology is a mirrored-server network which is a network having two file servers, one mirroring the other. Both file servers are configured to contain the same data, i.e., to "mirror" one another. Therefore, if one of the file servers crashes, the entire system will continue operating on the still-functioning file server.

Mirrored-server topologies are typically implemented in client/server networks. A client/server network has a plurality of user workstations (or "clients") and a central file server (or "server") to which the workstations are connected. This is also called server-based networking. In contrast to peerto-peer networks in which workstations address data packets to each other, the workstations in a client/server network typically only address data packets to the file servers, with the file servers addressing data packets to the workstations.

Figure 6:
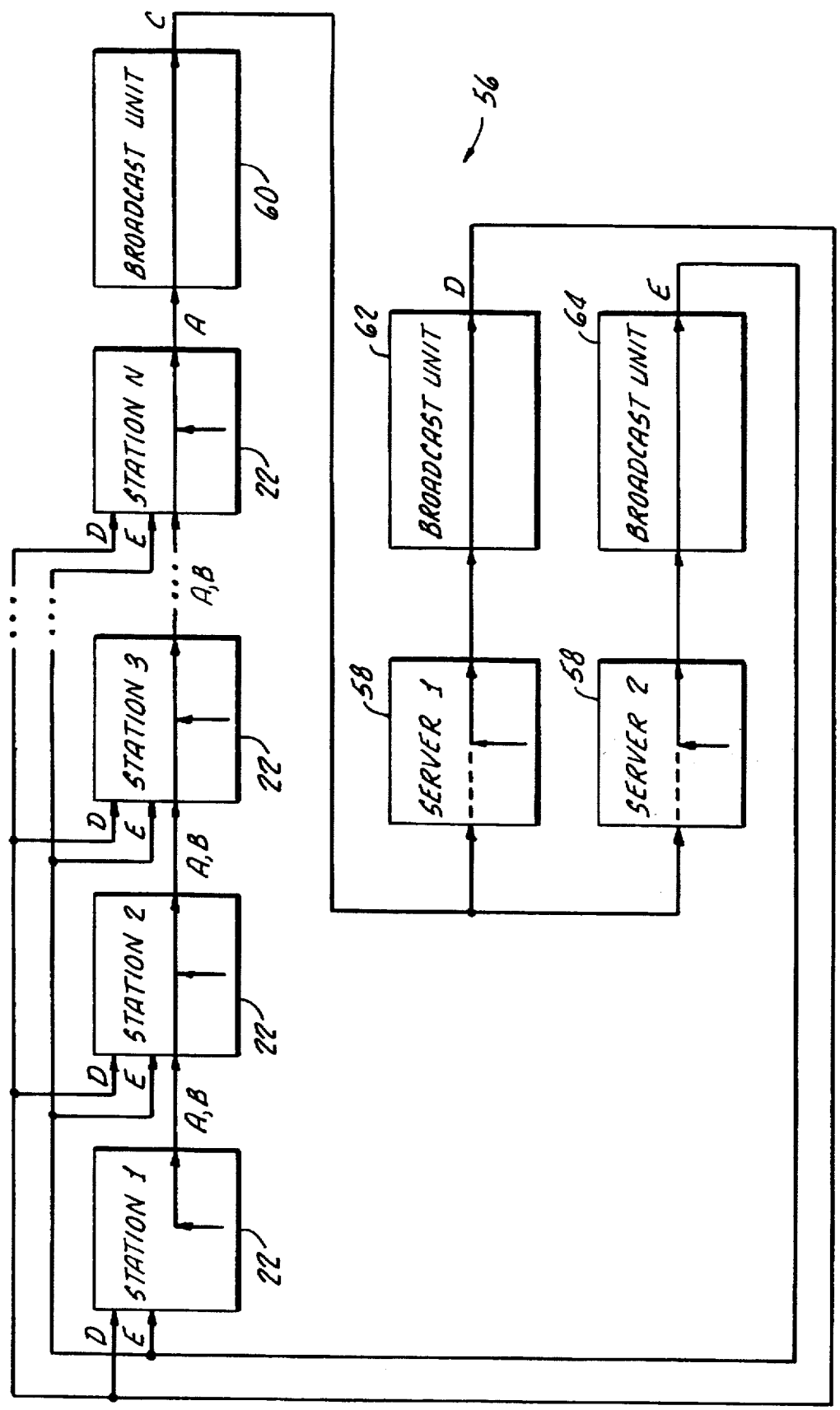
FIG. 6 is a block diagram of an exemplary embodiment of a network having mirrored servers implemented in accordance with networking principles of the present invention.

With reference to FIG. 6, a network 56 with mirrored servers implemented in accordance with the present invention is shown. The network 56 includes a plurality of workstations 22 (each workstation 22 preferably including a computer and a network interface card) and a pair of file servers 58 connected together with communication media. Each of the workstations 22 generates data packets intended for delivery to the file servers 58, and each of the file servers 58 generates data packets intended for delivery to the workstations 22. The communication media through which the workstations 22 and the file servers 58 communicate includes a plurality of channels, e.g., Channels A to E, as described below.

Each workstation 22 (except the last workstation in sequence, i.e., Workstation N) delivers data packets to the next workstation 22 in sequence on Channel A, and each workstation 22 (except the first workstation in sequence, i.e., Workstation 1) receives data packets from the previous workstation 22 on Channel B. Channels A and B are thus configured in a packet assembly channel. Workstation N delivers these sequentially routed data packets to a broadcast unit (on Channel A). The broadcast unit 60 broadcasts data from the workstations 22 to both of the file servers 58 on Channel C which is a workstation broadcast channel. Therefore, both file servers 58 receive the same data packets.

The file servers 58 each generate data packets, the same data packets in a mirrored-server configuration, to be delivered to the workstations on separate broadcast channels. File Server 1 provides a first server broadcast unit 62 with addressed data packets which then broadcasts these File Server 1 data packets to the workstations 22 on Channel D which is a first server broadcast channel. Similarly, File Server 2 provides a second server broadcast unit 64 with addressed data packets which then broadcasts these File Server 2 data packets to the workstations 22 on Channel E which is a second server broadcast channel. Each of the workstations 22 then receives the File Server 1 and 2 data packets on a first and a second server broadcast input connected to Channels D and E, respectively. Accordingly, if one of the file servers 58 crashes, the network 56 will continue to function on the still-functioning file server 58. Each of the workstations 22 is then able to toggle between the first and second server broadcast inputs to determine which data packets to receive.

According to another exemplary embodiment of the present invention, rather than address data packets only for the file servers, the workstations 22 may address data packets for delivery to another workstation. In this case, each of the file servers 58 may merge data packets generated thereby with the workstation data packets received on Channel C, which is shown by the dashed line in each file server 58.

The Mirrored-Server Network Hub

Figure 7:
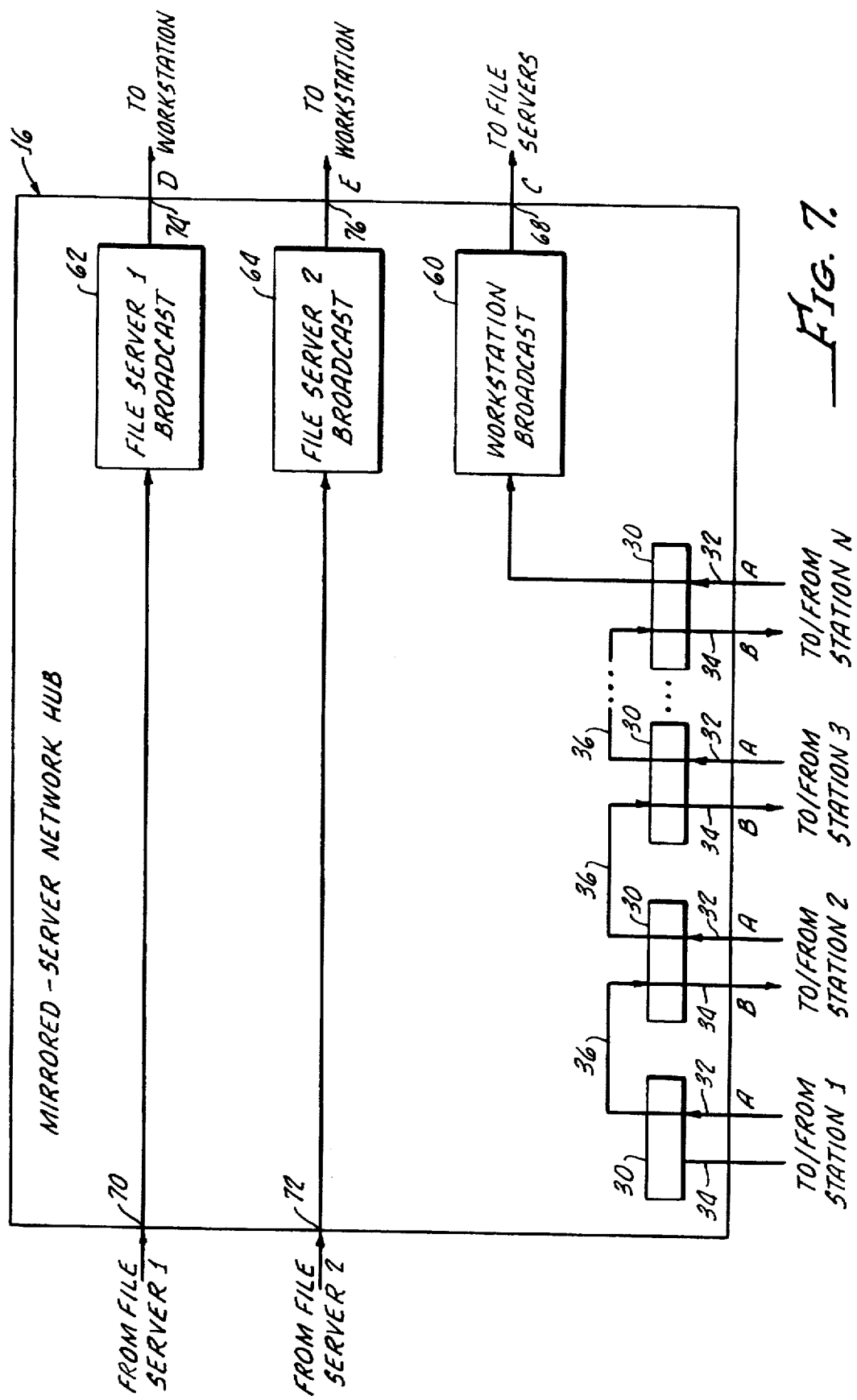
FIG. 7 is a block diagram of an exemplary embodiment of a network hub for use in a mirrored-server network configured in accordance with the invention.

With additional reference to FIG. 7, a network hub 66 implemented in accordance with the present invention is shown. As described with reference to the network hub 16 shown in FIG. 3, the network hub 66 configured for a mirrored-server environment includes a plurality of inputs 32 and outputs 34 formed into input-and-output pairs 30 which sequentially assemble data packets generated by Stations 1 to N on Channels A and B of the communication media. The hub 66 also includes a workstation broadcast output 68 for transmitting data packets which have been sequentially routed through the last workstation 22 in the network (i.e., Station N) to the file servers 58.

The mirrored-server network hub 66 has a first server broadcast input 70 connected to the first file server 58 (i.e., File Server 1) and receives data packets generated by File Server 1 via Channel D. The hub 66 also has a second server broadcast input 72 connected to the second file server 58 (i.e., File Server 2) and receives data packets generated by File Server 2. The first and second server broadcast inputs 70 and 72 are respectively connected to the first and second server broadcast units 62 and 64. Upon receiving data packets from the server broadcast inputs 70 and 72, the server broadcast units 62 and 64 respectively broadcast via Channels D and E these received data packets to the workstations 22.

The Wide Area Network

Figure 8:
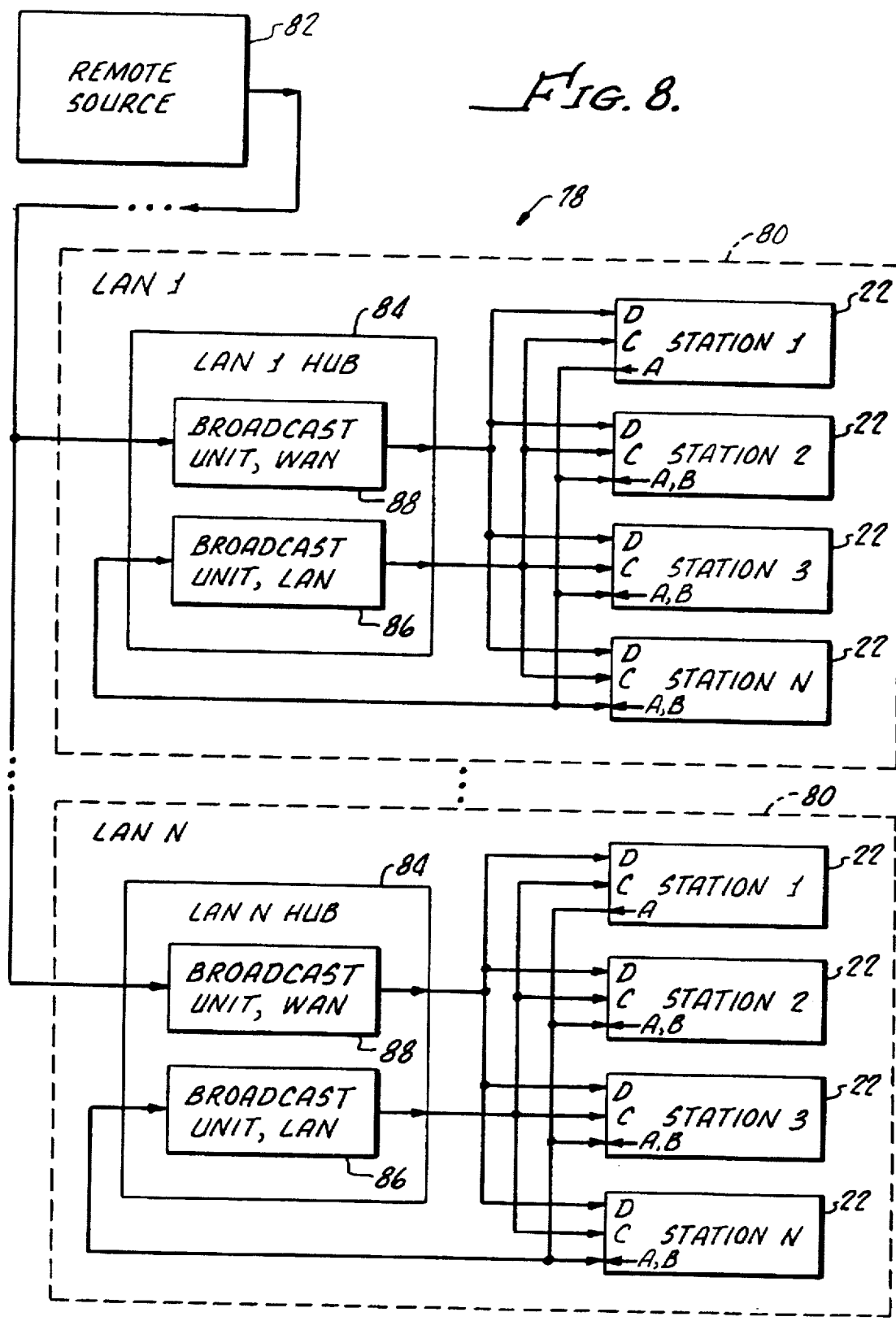
FIG. 8 is a block diagram of an exemplary embodiment of a wide area network implemented in accordance with networking principles of the present invention.

The networking principles of the present invention are not limited to peer-to-peer networks or client/server networks but may be implemented in wide area networks as well. With reference to FIG. 8, a wide area network (WAN) 78 in accordance with the present invention is shown. The WAN 78 includes a plurality of local area networks (LAN) 80 in communication with a remote source 82. Each of the LANs 80 is comprised of a plurality of stations 22 in communication with a network hub 84 via communication media. The remote source 82, which may be, for example, another network, a file server, a mail server, etc., communicates with the network hub 84 of each of the LANs 80.

The stations 22 of each LAN 80 sequentially gather data packets on Channels A and B of the communication media. A LAN broadcast unit 86 of each hub 84 then broadcasts the data packets from the stations 22 to the stations 22 on Channel C. This is performed analogously to the exemplary embodiments described above.

When the remote source 82 generates data packets to be delivered to the stations 22, the remote data packets are broadcast by the remote source 82 to each of the LANs 80 in the WAN 78. A WAN broadcast unit 88 of each of the network hubs 84 receives the remote data packets from the remote source 82 and broadcasts the remote data packets to each of the stations 22 on Channel D of the communication media.

In view of the description of networking principles of the present invention provided above, the network interface cards 14 and the network hub 16 do not require specialized communication media to implement a computer network according to the present invention. Most types of cable available on the market are able to carry the reception and the delivery channels 24 and 28, which will be discussed further below.

IMPLEMENTATION OF PREFERRED EMBODIMENTS

Figure 9:
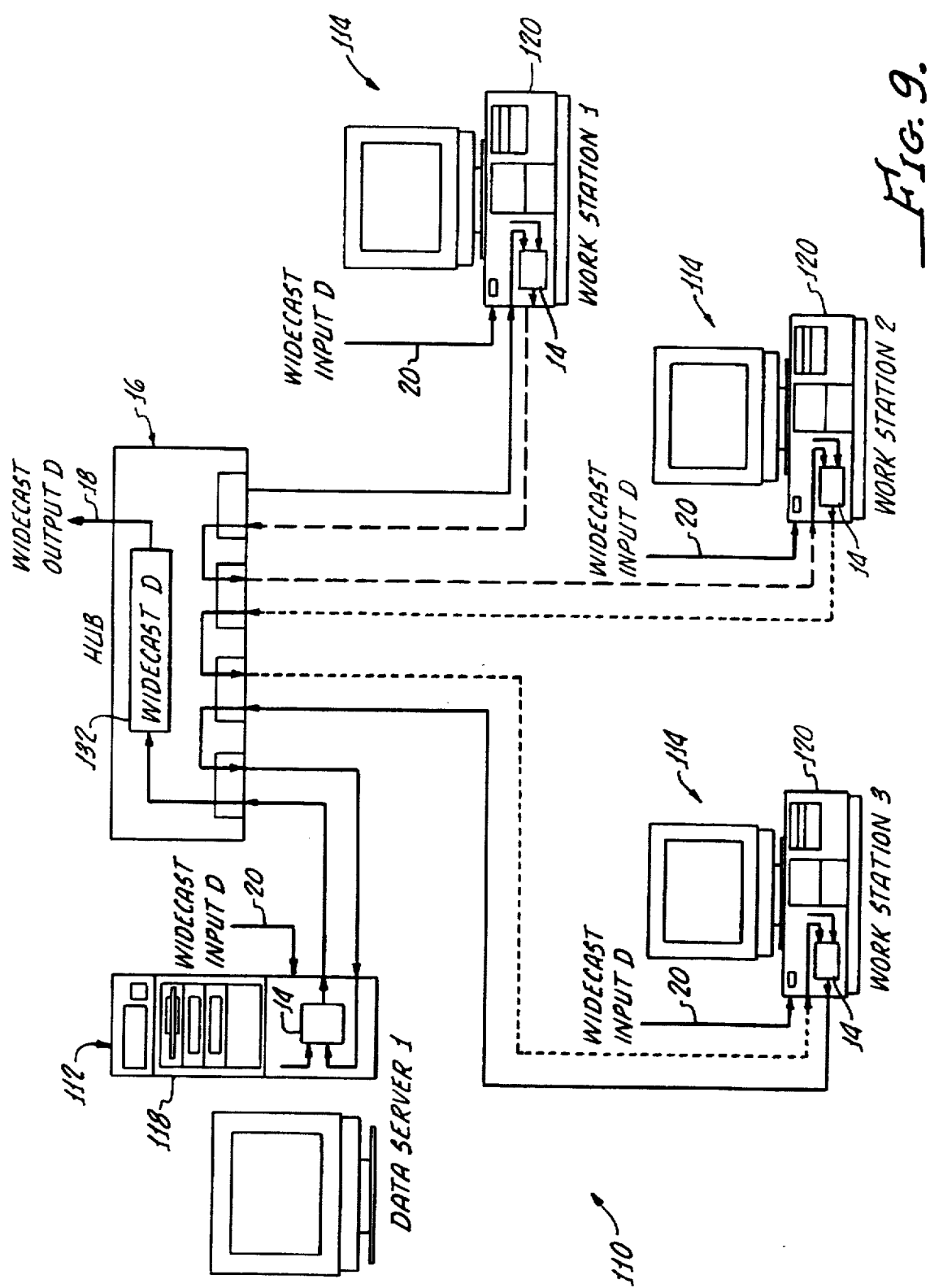
FIG. 9 is a schematic view of an exemplary embodiment of a computer network implement in accordance with the present invention, particularly illustrating a file-server network configuration.

With reference to FIG. 9, a network 110 includes a file server 112 in communication with a plurality of workstations 114 via a network hub 16. The file server 112 may include a processing unit or computer 118 which may incorporate any number of devices including internal and external disk drives, microprocessors, and so on as is known in the art. Similarly, the workstations 114 each may include a processing unit or computer 120 which in turn may include internal and external disk drives, processors, and so on as is known in the art.

The network 110 further includes a plurality of network interface cards 14. The data server 112 and each of the workstations 114 is provided with a network interface card 14. The network interface card 14 may be housed inside the computers 118 and 120, as shown in FIG. 9, or provided as a separate, stand-alone unit in communication with the computers. With additional reference to FIG. 10, each of the network interface cards 14 may be in the form of a computer card with an interface bus 124 for connection with the respective computer 118 and 120. The various connections between the network interface card 14, the network hub 16, and the processor units 118 and 120 may be made with known cables, which will be discussed in detail below.

The network interface card 14 preferably has three network inputs B, C, and D and one network output A, each in the form of cable pairs. Input B is a remote input while inputs C and D are system broadcast inputs. Output A is a combined output of the network interface card 14, preferably comprising cable pair 1 of the connector. Each of these connections has a specific and designated purpose in the wide bandwidth technology of the present invention.

The network interface card 14 may include a remote input first-in-first-out (FIFO) memory device 126 in communication with remote input B, and a local data FIFO memory device 128 in communication with the processor of the server 112 or the respective workstation 114 at which the network adapter 14 is located. The network adapter 14 may further include a microprocessor or state machine 130 in communication with the FIFO memory devices 126 and 128. The combined output A is output from the state machine 130. Accordingly, data packets that are input to the network interface card 14 through remote input B are combined in the state machine 130 with locally transmitted data from the local FIFO 128 and then sent to the hub 16 via the combined output A.

Turning briefly to conventional networking arrangements, Ethernet-type schemes synchronize data transmissions from one computer to other computers on the local area network through a technique of data collision detection and recovery. In these contention-type networks, a considerable percentage of network bandwidth can be lost through data collisions when the network is under heavy utilization.

The networking technology of the present invention, however, is a contentionless protocol. Data collisions are prevented by a loop-through approach which is accomplished in the network interface card 14 or hub 16. Data packets from other computers or workstations 114 enter the adapter 14 through remote input B. These incoming packets are stored in the remote input FIFO memory device 126. The remote input memory device 126 is sized with adequate depth to enable the temporary storage of the largest packet supported by the network 110. Local data, that is, data generated by the workstation 114 at which the specific network adapter 14 is located, to be transmitted is loaded into the local data FIFO memory device 128 through the interface bus 124 with the computer unit 118 or 120. The task of managing the synchronization of packets to be transmitted is accomplished by the microprocessor or state machine 130.

When one of the network interface cards 14 begins to receive a remote packet of data at remote input B, the state machine 130 detects the receipt of the packet of data by detecting a change in the status of the "empty" flag of the FIFO memory device 126, thereby signaling the beginning of the arrival of an incoming data packet. Upon such detection, the state machine 130 immediately begins transmitting, via combined output A, the incoming packet. In those instances when the local machine or workstation has created a packet of data for transmission and where the empty flag of the remote input FIFO memory device 126 indicates that no remote packet of data is being received, the state machine 130 then transmits a local packet at the local memory device 128 via the combined output A.

If a remote packet of data is received by the state machine 130 from the remote FIFO 126 while the state machine 130 is in the process of transmitting a local packet of data from the local FIFO 128, the remote packet is stored in the remote input FIFO 126 and is transmitted immediately upon completion of the transmission of the local packet. As the combined output A preferably transmits at the same data rate as remote input B and as the remote input FIFO has the capacity to store an entire incoming packet of data, data overflow does not occur. By this method, local packets of data are insertable into the data stream to be output from output A.

System broadcast inputs C and D have a special and unique function within the wide bandwidth network 110. The adapter 14 has the ability of inputting data through either input C or D, one at a time, selectable under software control (stored on and activated by, for example, the processor units 118 or 120). As will be shown later, the two system broadcast inputs C and D input data to the local machine (i.e., the server 112 or workstation 114 at which the adapter is located) and can be used in a diversity of methods depending on the requirements and restraints of the individual installation.

With further reference to FIG. 9, the wide bandwidth network interface card 14 is shown installed in a LAN configuration. In this exemplary embodiment, one of the workstations 114, for example, workstation 1, initiates a "chained" data stream. Local data generated at workstation 1 is transmitted over the network 110 by workstation 1 and travels to the hub 16, where the workstation 1 local data is rerouted or "combined" to remote input B of the network adapter 14 located at workstation 2. As described in above, workstation 2 synchronizes the transmission of workstation 1 data with its own local data transmission, sending the combined output of workstation 1 and 2 local data to the hub 16 via combined output A where this combined data is chained to workstation 3. Workstation 3 in turn synchronizes the transmission of workstation 1 and 2 data with its own local data transmission, sending the combined output of workstation 1, 2, and 3 local data to the hub 16 via combined output A. In other words, transmissions from the combined output A of workstation 3 contain the combined queries or transmissions of all the workstations 114 of the network 110, which workstations 114 number three in this example. The workstation 3 transmissions are in turn chained through the hub 16 to the data server 112.

Although in many installations the data transmissions from the workstations 114 are addressed to server 112, the specifically addressed data transmissions are not "picked-off" the data stream at this time. Rather, these combined transmissions are synchronized with the output A from the server 112, the combined result then returning to the network hub 16. The hub 16 includes a system broadcast amplifier 132 which receives the combined transmissions from the data server 112 and outputs the system broadcast transmission D.

An exemplary process for addressing data packets may include the following steps. Prior to the transmission of each packet, the computer loads into the network interface card 14 the destination and source MAC addresses. A MAC address is a unique number assigned to every network interface card 14. The first 48 bits of the MAC address are the vendor's ID assigned to that vendor by the I.E.E.E. The last 48 bits are a distinguishing number for each board assigned by the manufacturer of the board. The sender's source address is stored in permanent memory on the network interface card 14. During the start-up and initialization procedure, the computer reads the MAC address of the network interface card 14 connected thereto. The computer then loads the address into a register at an appropriate time. From the data loaded in the register, the network interface card 14 creates and sends the addressed data packet.

An exemplary process for receiving data packets may include the following steps. The network interface card 14 receives an address from the computer for the desired packet. Most of the time, this address would be the local MAC address of the particular network interface card 14. At other time, other addresses may be used. For example, a promiscuous mode utilized by network-monitoring products is programmed to receive all packets with all labels. There may be another address for broadcast packets. After the network interface card 14 is programmed with a receive address, the network interface card 14 then automatically monitors packet traffic and captures only those packets which fulfill the address requirement programmed by the computer.

Returning to the embodiment shown in FIG. 9, in wide bandwidth terminology, "system broadcast" or WideCast™ is used to refer to a signal or transmission which is simultaneously sent to a number of computers, workstations, servers, etc. In the example illustrated in FIG. 9, system broadcast output D is delivered simultaneously as system broadcast input D to each of the workstations 114 and to the server 112. The system broadcast output D signal is delivered to every computer connected to the hub 16. (This connection has been omitted from the drawings for the sake of clarity.) System broadcast output D is preferably transmitted over pair four of the unshielded twisted pair (UTP)-5 cable connecting each computer unit 118 and 120 (i.e., the adapter 14) to the hub 16. Even in installations with system broadcast channels C and D, only a single UTP-5 cable is required to provide all four data communications paths of the system 110.

As packets of data are received at each computer 112 and 114 via system broadcast D, the network interface card 14, which monitors all of the packet transmissions on the channel, selects and retrieves those packets of data addressed to the local computer at which the particular network interface card 14 is located. It is by this method that round-trip communications are accomplished in the wide bandwidth environment of the present invention.

Figure 11:
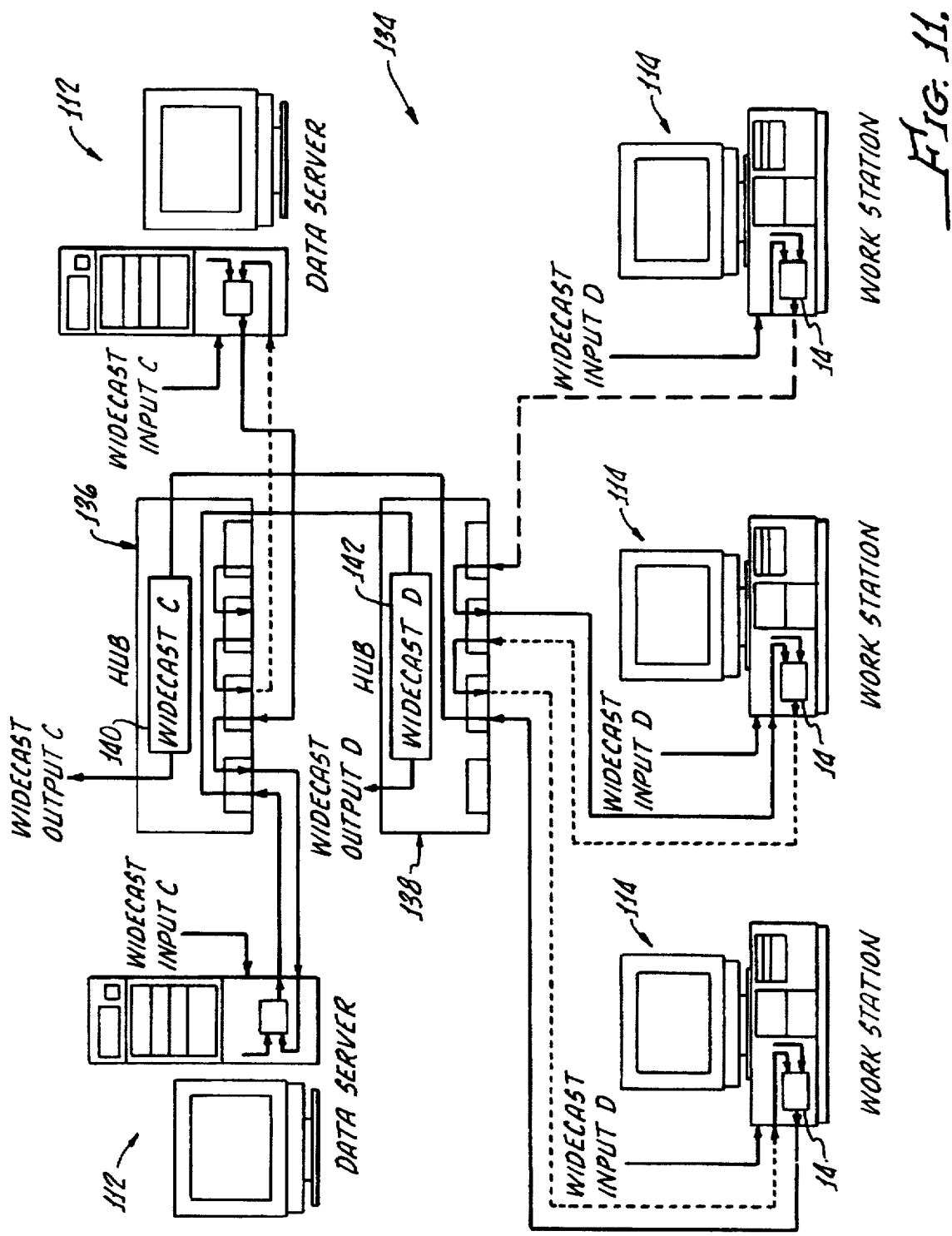
FIG. 11 is a schematic view of an exemplary embodiment of a computer network implemented in accordance with the invention, particularly showing a dual file-server network configuration.

Referring to FIG. 11, there is shown a wide bandwidth network 134 in which a pair of hubs, a server hub 136 and a workstation hub 138, are provided, as well as more than one server 112. In this embodiment of the wide bandwidth network technology of the present invention, the transmissions of the workstations 114 have been separated from the transmissions of the servers 112. In the embodiment of FIG. 9, the bandwidth of a single hub 16 is limited to the combined transmission of all workstations 114 and servers 112. By dividing the chained outputs of the workstations 114 from the chained outputs of the servers 112 as shown in the embodiment of FIG. 11, the available bandwidth is doubled. Further, the server hub 136 includes a system broadcast C amplifier 140 which transmits system broadcast output C to all the servers 112 connected to the server hub 136, and the workstation hub 138 includes a system broadcast D amplifier 142 which transmits system broadcast output D to all the workstations 114 connected to the workstation hub 138.

FIG. 12 illustrates a simplified wiring diagram of a wide bandwidth hub 144 according to the present invention. The wide bandwidth hub 144 provides a simple method of connecting up to 24 computers into a LAN by tying together sequentially inputs and outputs of the hub 144 (respectively represented by reference numerals 1 to 24), thereby connecting the combined output of one of the computers of the LAN to the remote input of another one of the computers of the LAN. It is also possible to interconnect or cascade multiple hubs 144 through the utilization of the special input/output connections. Since the necessity of detecting collisions has been eliminated from the WideBand design, the Ethernet limitation of hub interconnections has been eliminated. If one of the hub ports (1 to 24) is vacant or unconnected, the chaining from channel to channel is broken. This method provides the user with the capability of dividing networks into smaller segments to increase bandwidth in implementations such as the dual-hub embodiment illustrated in FIG. 11. Alternatively, means may be provided to automatically bypass unconnected channels with a bypass relay.

Figure 13:
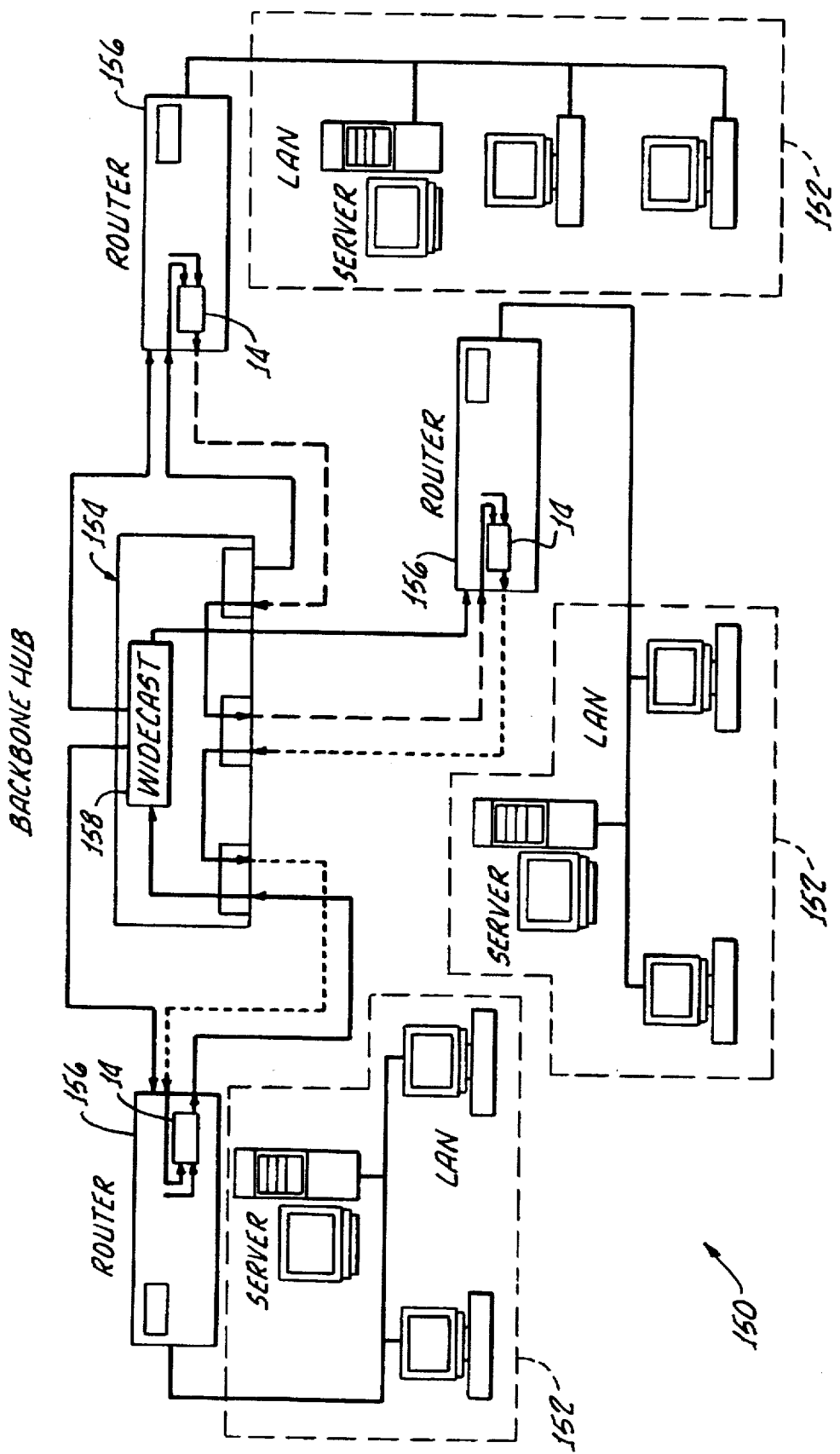
FIG. 13 is a schematic view of an exemplary embodiment of a computer network implemented in accordance with the invention, particularly showing a wide area network configuration.

The WideBand hub 144 is designed in such a way that numerous innovative approaches of implementation are possible. FIG. 13 illustrates another exemplary embodiment of the wide bandwidth network technology of the present invention. A wide area network 150 includes a plurality of LANs 152 each including a combination of workstations and servers. A hub 154 and a corresponding number of routers 156 are connected into a backbone configuration. Each of the routers 156 has a network interface card 14 analogous to that described above in reference to FIG. 10. In this embodiment, the hub 154 includes a system broadcast amplifier 158 which transmits the combined data stream of all of the LANs 152 to each of the routers 156 connected to the hub 154.

Figure 14:
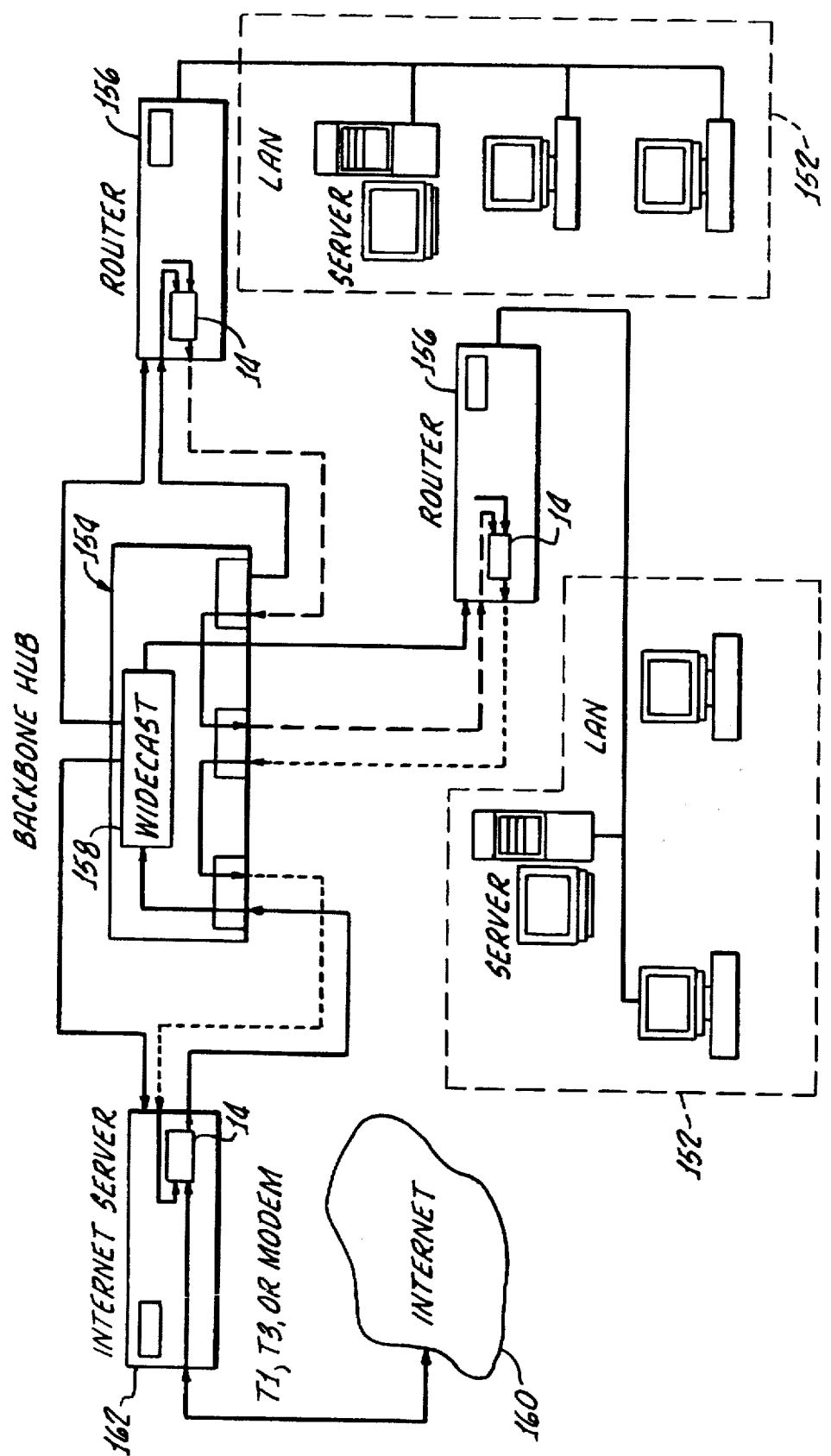
FIG. 14 is a schematic view of an exemplary embodiment of a computer network implemented in accordance with the present invention, particularly illustrating a wide area network configuration with access to the Internet.

With reference to FIG. 14, another implementation of the wide bandwidth technology of the present invention is illustrated. The network of FIG. 14 is similar to that of FIG. 13 with the addition of access to the Internet, represented by reference numeral 160, via an Internet server 162 including a network adapter 14. In this installation, a high-speed Internet interface such as a T1 or a T3 is coupled, full speed, all the way to the desktop.

Figure 15:
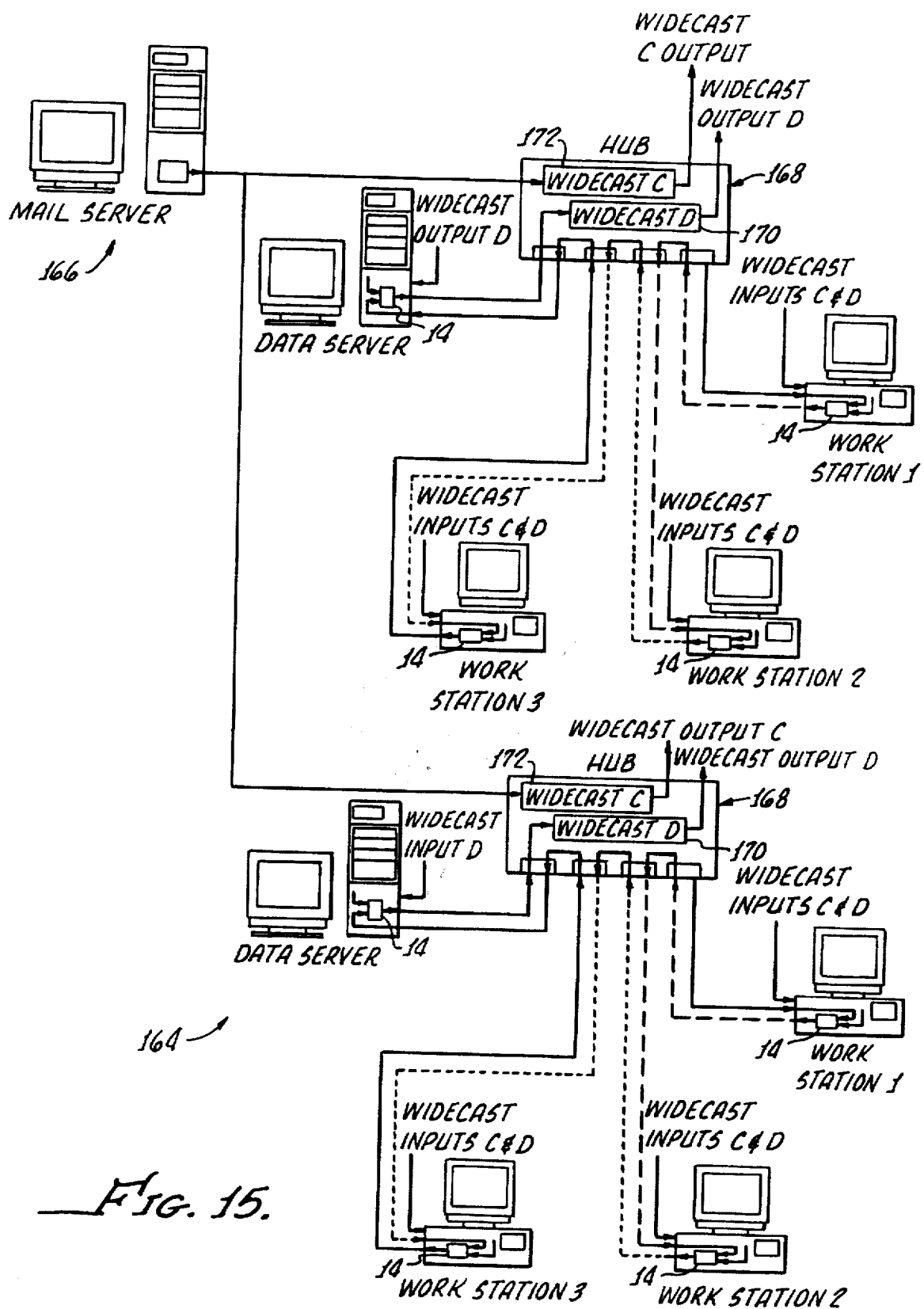
FIG. 15 is a schematic view of an exemplary embodiment of a computer network implemented in accordance with the present invention, particularly showing a wide area network configuration with access to a mail server.

FIG. 15 illustrates a wide area network 164 in accordance with the present invention. The wide bandwidth components are connected into wide area networks in which system broadcast D is utilized for distribution of local area network traffic and in which system broadcast C provides a high-speed, enterprise-wide channel which greatly simplifies E-mail installations and accelerates wide area communications via a mail server system 166.

More specifically, each of the networks includes a combination of servers and workstations, as well as a hub 168 including a system broadcast D amplifier 170 corresponding to combined data streams of the local area network and a system broadcast C amplifier 172 corresponding to the mail server 166. When workstations and servers of the local area networks are not monitoring system broadcast input D to retrieve local data by means of the network interface cards 14 contained therein, the network interface card 14 monitors system broadcast input C to retrieve locally addressed mail and message packets transmitted from the mail server system 166.

Figure 16:
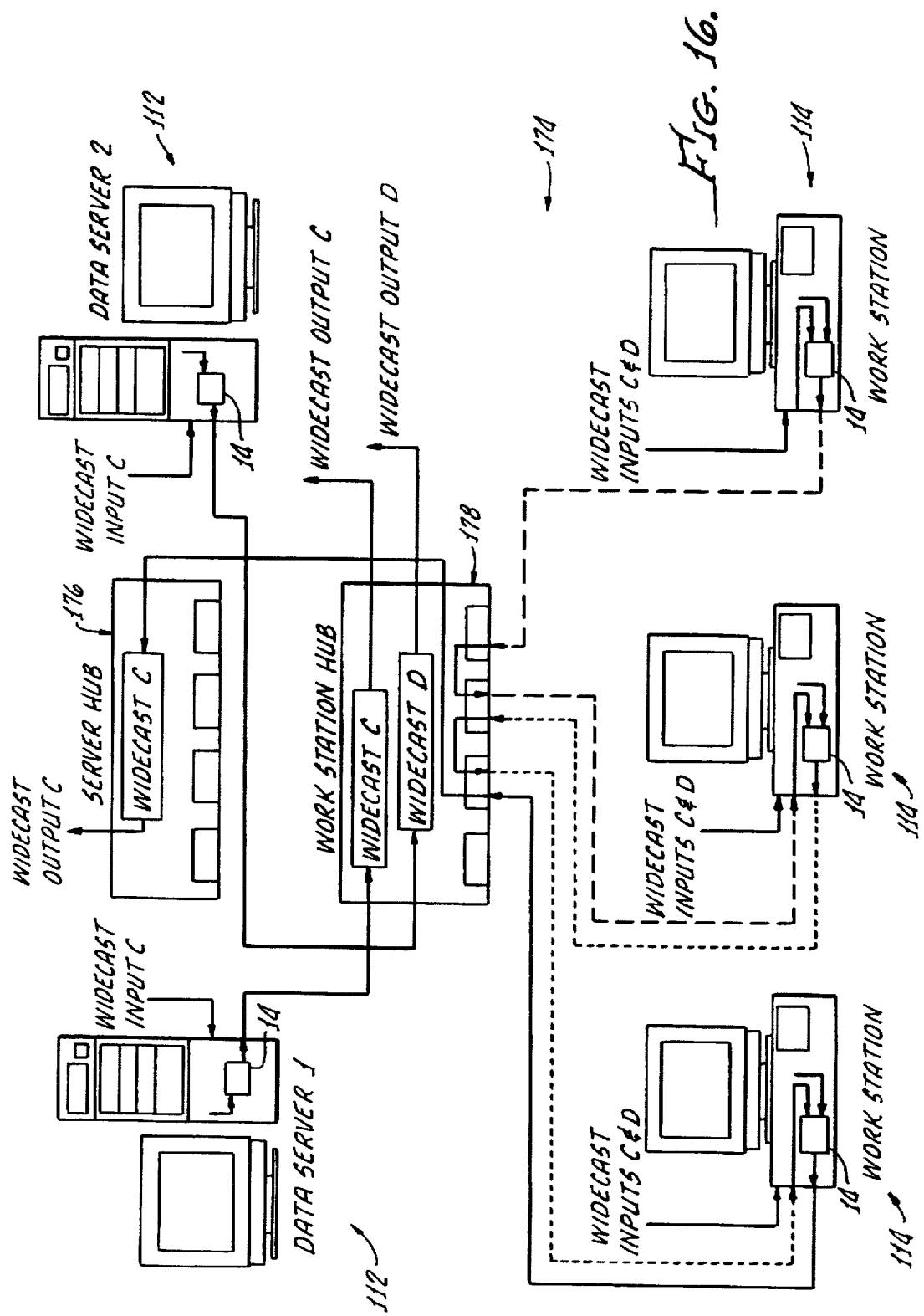
FIG. 16 is a schematic view of an exemplary embodiment of a computer network implemented in accordance with the present invention, particularly showing a mirror-server configuration.

The implementation of the wide bandwidth network 174 of the present invention illustrated in FIG. 16 depicts two servers 112 operating in parallel or in a "mirrored" mode. All of the queries to the servers 112 are delivered simultaneously to both servers 112 over system broadcast output C from a server hub 176. The output of file server 112 is delivered to each of the workstations 114 over system broadcast channel C from a workstation hub 178, whereas the output transmissions of file server 112 are delivered to each of the workstations 114 via the system broadcast channel D of the workstation hub 178.

When the wide bandwidth technology of the present invention is configured in this manner, both hubs 176 and 178 operate in parallel, processing requests and responding to the workstations 114. Significantly, however, both servers 112 are completely independent and redundant, even down to the cable pair over which the server data is delivered to the workstations 114. In the event that one of the file servers 112 were to malfunction and one of the workstations 114, therefore, were not to receive a response to a request, the workstation 114 could then independently switch from input channel D to input channel C and continue processing with the still functioning server 112.

Figure 17:
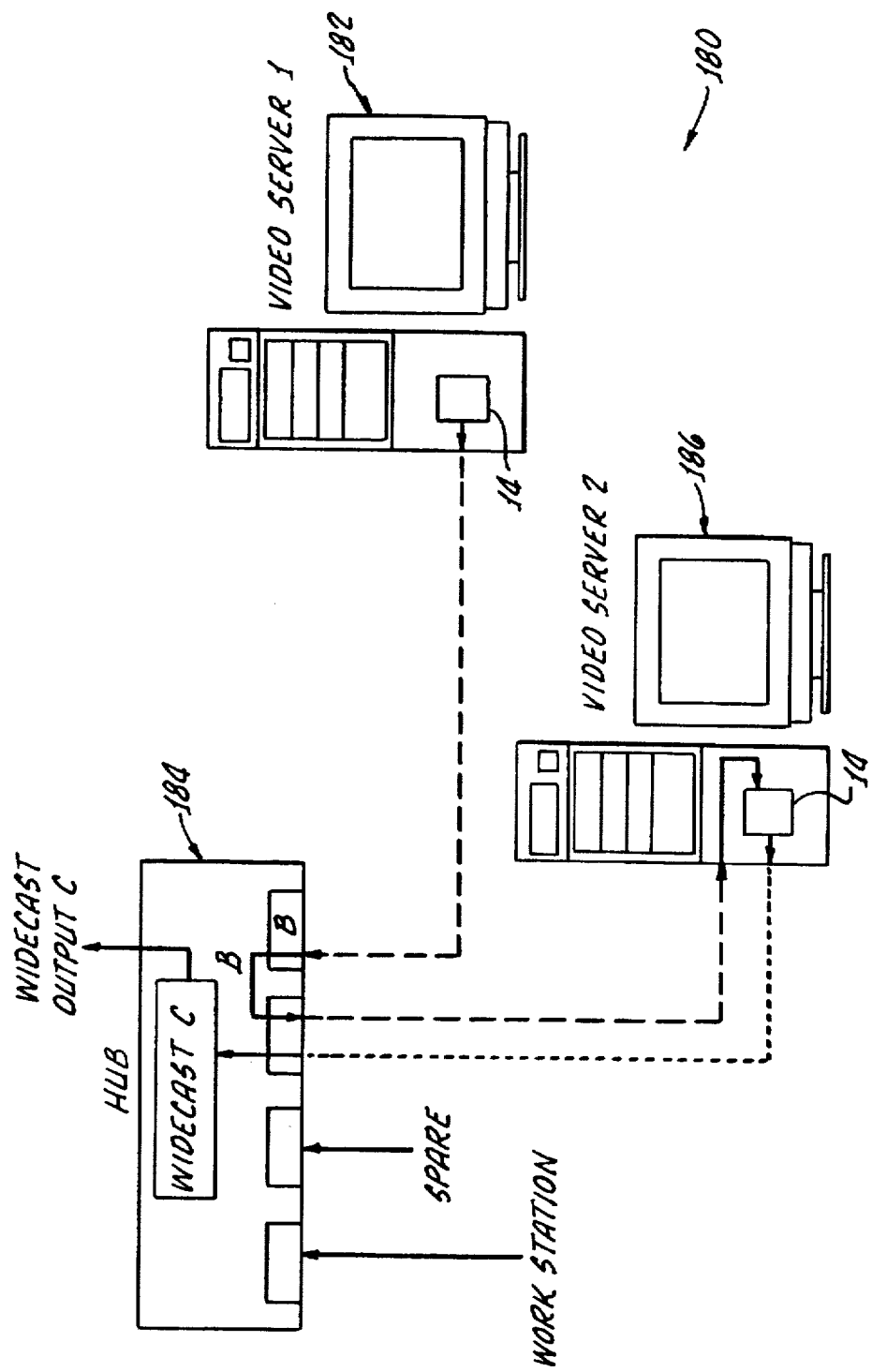
FIG. 17 is a schematic view of an exemplary embodiment of a computer network implemented in accordance with the present invention, particularly illustrating a video-server network configuration.

With reference to FIG. 17, yet another exemplary embodiment of the present invention is shown. This wide bandwidth network 180 includes a video source 182 connected to a network hub 184 via input port B. A second video source 186 is connected to the next port, continuing down the chain as discussed in reference to FIG. 17. As video data is time sensitive, packets of data can automatically be sent over the network 180 in synchronization with the demands of the video capture device as shown.

Having discussed exemplary embodiments of the wide bandwidth network technology of the present invention thus far, more specific implementations of the technology will now be discussed. The synchronization of data packets at the workstations 114 can be accomplished utilizing FPGA technology such as the Cypress 384, 385, and 387 FPGAs. These devices are fast and user programmable. They can also simultaneously perform data encryption functions as disclosed in U.S. patent application Ser. No. 08/430,942 filed on Apr. 26, 1995, which application is incorporated herein by reference and by appending a copy of the application hereto.

As discussed above, from the FIFO memory devices, 126 and 128 of the network adapter 14, data is transmitted serially. One way to accomplish this serial transmission is by transferring the data into the parallel input of a device such as the Cypress CY7B923 which performs 8B/10B coding and which creates the differential high-speed serial output. Details on various coupling and termination techniques for serial communication are discussed in the CY7B923 and 933 Data Book.

Preferable technical specifications of the present invention follow. Wideband data is transmitted from the server 112 to the workstations 114 at a bit rate of preferably 333 Mbps over each twisted pair of UTP-5 cables. Eight-bit data is converted into a 10-bit format to maintain clock synchronization, to provide a method of hardware error detection, and to enable the transmission of control characters. The decoding of 10-bit data back to its original 8-bit format on the receiving side results in a useful data rate throughput of 267 Mbps per cable pair or 33 megabytes per second (MBps). Since three or the four twisted pairs of the UTP-5 cable are utilized to transfer data by the wide bandwidth technology, the total data rate is preferably 1.0 Gbps. The fourth pair is utilized for data synchronization. The preferred technical specifications of the wide bandwidth technology of the present invention are presented in TABLE 1.

TABLE 1

| Data Rate: | 1,000 Mbps (over UTP-5 cable) |
|---|---|
| | 800 Mbps usable |
| Byte Rate: | 100 MBps |
| | 33 MBps/cable pair |
| Raw Bit Rate: | 333 Mbps/cable pair |
| | (10-bit bytes) |
| Encoding: | 8B/10B |
| Output Signal: | 100K ECL serial |
| Bit Error Rates: | $10^{-12}$ or better |

Wideband transmission distances over UTP-5 cable are 100 m (330 ft). Transmission distances of other types of cabling and fiber are presented in TABLE 2.

TABLE 2

| Cable Type | Uncompensated Transmission | Compensated Transmission |
|---|---|---|
| UTP-5 Unshielded Twisted Pair | 50 m (165 ft) | 100 m (330 ft) |
| UTP-3 Unshielded Twisted Pair | 18 m (60 ft) | Not Recommended |
| RG-59 A/U Coax (75 ohm) | 75 m (250 ft) | 150 m (500 ft) |
| RG-62 A/U Coax (93 ohm) | 98 m (325 ft) | 200 m (650 ft) |
| Fiber optic LED driver | 1,000 m (3,300 ft) | n/a |

The trappings on the cables range from metal Ethernet T-connectors to the simple plastic modular plugs used with unshielded twisted pair (UTP) wire. Some Ethernet cards have connectors for coaxial cable, and others provide a 15-pin socket for more complex external transceivers for fiber optic and other types of cables. Token Ring cards have a 9-pin connector for shielded twisted pair (STP) wire. However, UTP wire is becoming increasingly popular for both Ethernet and Token Ring cards. These cards have a simple plastic rectangular jack (e.g., RJ-45) similar to those found on modern telephones.

Applications requiring greater transmission distances can utilize passive equalization to increase cable length. Table 2 also provides data transmission distances for systems compensated with passive equalization.

Wideband networking is a sophisticated yet simple approach to increasing data transmission bandwidth in local and wide area networks over existing cabling. Wideband utilizes the basic technology of ATM but with modifications which make it more readily compatible with existing application software and the OSI seven-layer model. Through all its various configurations, it provides a versatile alternative in high-speed networking.

The network interface cards do not need to use copper cables. The network interface cards may be configured to read pulses of laser light sent over fiber optic cables, pulses of infrared light sent through the air, or signals imposed on radio waves. Many installations may use copper cables for most connections and intermix fiber optic or wireless alternatives to reach special stations.

Those skilled in the art will understand that the preceding exemplary embodiments of the present invention provide foundation for numerous alternatives and modifications. These other modifications are also within the scope of the wide bandwidth network technology of the present invention. Accordingly, the present invention is not limited to that precisely shown and described herein.

What is claimed is:

1. A method for communicating data in a wide area network including a plurality of local area networks (LANs) and a remote source, each of the LANs including a plurality of workstations connected in a chain beginning with a first workstation and ending with a last workstation, the method comprising the steps of:
   a) sequentially routing data issued by any of the workstations through the last workstation;
   b) broadcasting data sequentially routed through the last workstation to each of the workstations on a broadcast channel;
   c) transmitting data generated at the remote source to each of the LANs; and
   d) broadcasting data transmitted from the remote source to each of the workstations on a broadcast channel separate from the broadcast channel carrying the sequentially routed data.

2. The method of claim 1 further comprising the step of:
   detecting data at each workstation intended for delivery to the workstation from the data sequentially routed through the last workstation;
   detecting data at each workstation intended for delivery to the workstation from the data transmitted from the remote source; and
   delivering the detected data to the workstation.

3. A wide area network comprising:
   a) a remote source capable of generating addressed data packets, said remote source including a remote broadcast output for broadcasting addressed data packets;
   b) a plurality of local area networks (LANs) in communication with said remote source, each of said LANs including:
      (1) a plurality of workstations each having a unique address and being capable of generating addressed data packets, each of said workstations including:
         (a) a packet assembly input for receiving addressed data packets from another workstation;
         (b) a packet assembly output for delivering addressed data packets to another workstation;
         (c) a LAN broadcast input for receiving addressed data packets from said workstations in said LAN;
         (d) a remote broadcast input for receiving addressed data packets from said remote source; and
         (e) an interface connected to said packet assembly input, said packet assembly output, said LAN broadcast input, and said remote broadcast input, said interface for:
            (i) merging addressed data packets received at said packet assembly input with addressed data packets generated by said workstation into a stream of workstation-addressed data packets;
            (ii) delivering said stream of workstation-addressed data packets to said packet assembly output;
            (iii) detecting addressed data packets from said LAN broadcast input and said remote broadcast input which bear the unique address of said workstation; and
            (iv) delivering said detected packets to said workstation for further processing;
      (2) a packet assembly channel for assembling addressed data packets generated by all of said workstations, said packet assembly channel for connecting each of said workstations together in a sequential chain beginning with a first of said workstations and ending with a last of said workstations, said chain being formed by connecting the packet assembly output of each of said workstations, except the last of said workstations, to the packet assembly input of the next workstation in sequence through a packet communication connection; and
      (3) a LAN broadcast channel including a packet communication connection between the packet assembly output of the last of said workstations and the LAN broadcast input of each of said workstations; and
   c) a remote broadcast channel consisting of a packet communication connection between the remote broadcast output of said remote source and the remote broadcast input of each of said workstations.

4. A hub for communicating addressed data packets between a remote source and local area networks (LANs) in a wide area network via communication media, the LANs including a plurality of workstations being capable of generating addressed data packets intended for delivery to a workstation in the LAN, the remote source being capable of generating addressed data packets intended for delivery to a workstation, the communication media including a packet reception channel, a LAN broadcast channel, and a remote broadcast channel, said hub comprising:
   a) a sequential interface for sequentially routing addressed data packets through the plurality of workstations and through a last workstation via the packet reception channel, the sequential interface including:
      (1) a plurality of inputs each for receiving, via the packet reception channel, addressed data packets from a workstation in the network; and
      (2) a plurality of outputs each for providing, via the packet reception channel, addressed data packets to a workstation in the network; and
   b) a LAN broadcast interface for broadcasting addressed data packets generated by the plurality of workstations to each of the workstations in the LAN via the LAN broadcast channel, the broadcast interface including:
      (1) a LAN broadcast input connected to the sequential interface for receiving addressed data packets which have been sequentially routed through the last workstation; and
      (2) a LAN broadcast output connected to the LAN broadcast input for transmitting, via the LAN broadcast channel, addressed data packets received at the remote broadcast input to each of the workstations; and
   c) a remote broadcast interface for broadcasting addressed data packets generated by the remote source to the plurality of workstations via the remote broadcast channel, the remote broadcast interface including:
      (1) a remote broadcast input connected to the remote source for receiving addressed data packets generated by the remote source; and
      (2) a remote broadcast output connected to the remote broadcast input for transmitting, via the remote broadcast channel, addressed data packets received at the remote broadcast input to each of the workstations.

* * * * *